United States Patent [19]
Nozaki et al.

[11] Patent Number: 5,225,927
[45] Date of Patent: Jul. 6, 1993

[54] REAL IMAGE TYPE FINDER HAVING CEMENTED LENS WITH AT LEAST ONE RESIN LENS ELEMENT

[75] Inventors: Katsuhiko Nozaki; Tetsuya Abe, both of Tokyo, Japan

[73] Assignee: Asahi Kogaku Kogyo K.K., Tokyo, Japan

[21] Appl. No.: 515,957

[22] Filed: Apr. 27, 1990

Related U.S. Application Data

[63] Continuation-in-part of Ser. No. 426,655, Oct. 26, 1989, Pat. No. 4,992,809.

[30] Foreign Application Priority Data

| Oct. 28, 1988 | [JP] | Japan | 63-140823 |
| Dec. 27, 1988 | [JP] | Japan | 63-330466 |
| Dec. 27, 1988 | [JP] | Japan | 63-330467 |
| Oct. 26, 1989 | [JP] | Japan | 1-278987 |

[51] Int. Cl.$^5$ .............. G03B 13/02; G02B 13/14; G02B 15/00
[52] U.S. Cl. .................. 359/355; 354/222; 359/642; 359/676; 359/722; 359/818
[58] Field of Search ............ 350/253, 417, 1.2; 359/350, 355, 642, 676, 722, 683, 818; 354/219, 222

[56] References Cited

U.S. PATENT DOCUMENTS

| 3,807,842 | 4/1974 | Baker | 352/78 |
| 4,081,809 | 3/1978 | Kuboshima | 354/199 |
| 4,526,444 | 7/1985 | Fantone et al. | 350/501 |
| 4,653,872 | 3/1987 | Takahashi | 350/427 |
| 4,662,717 | 5/1987 | Yamada et al. | 359/362 |
| 4,690,512 | 9/1987 | Forsyth | 350/417 |
| 4,725,130 | 2/1988 | Ozawa | 359/690 |
| 4,751,539 | 6/1988 | Yamada et al. | 354/222 |
| 4,757,336 | 7/1988 | Nakayama et al. | 354/219 |
| 4,763,998 | 8/1988 | Tsuji et al. | 359/687 |
| 4,834,513 | 5/1989 | Nozawa | 359/688 |
| 4,842,395 | 6/1989 | Sato et al. | 350/519 |
| 4,854,680 | 8/1989 | Kikuchi | 359/689 |
| 4,887,109 | 12/1989 | Fujita et al. | 354/222 |
| 4,906,078 | 3/1990 | Inabata et al. | 359/680 |
| 4,909,614 | 3/1990 | Itoh et al. | 359/683 |
| 4,941,012 | 7/1990 | Inabata | 354/478 |
| 4,945,372 | 7/1990 | Higuchi et al. | 354/199 |
| 4,969,723 | 11/1990 | Kato et al. | 359/429 |
| 4,992,809 | 2/1991 | Nozaki et al. | 354/149.11 |
| 5,034,764 | 7/1991 | Inabata | 354/223 |

FOREIGN PATENT DOCUMENTS

| 2647611 | 4/1978 | Fed. Rep. of Germany | 350/1.2 |
| 3405789 | 8/1984 | Fed. Rep. of Germany | 350/417 |
| 61-200523 | 9/1986 | Japan . | |
| 63-37309 | 2/1988 | Japan | 350/417 |
| 2062890A | 5/1981 | United Kingdom . | |

OTHER PUBLICATIONS

Japanese Abstract of 60-78434; vol. 9, No. 217; p. 350--Sep. 4, 1985.
Rudolf Kingslake, "The Development of the Zoom Lens", Aug. 1960, Journal of the SMPTE, vol. 69 pp. 534-544.
"Yashica Samurai X 0.3"-MFM 6/88-236-1988.
French Search Report-FR 91064515-Sep. 2, 1991.
French Search Report-FR 8914178-Sep. 1, 1991.
"UV Stabilizers", Kirk-Othmer, Encyclopedia of Chemical Technology, vol. 23, Third Ed., 1983, pp. 615-627.

*Primary Examiner*—Bruce Y. Arnold
*Assistant Examiner*—David R. Parsons
*Attorney, Agent, or Firm*—Sughrue, Mion, Zinn, Macpeak & Seas

[57] ABSTRACT

A real image type view finder comprising at least one cemented lenses. Of the lens components constituting the cemented lens, a lens component is made of resin. The lens component may be made of material of high transmittance to ultraviolet rays.

18 Claims, 26 Drawing Sheets

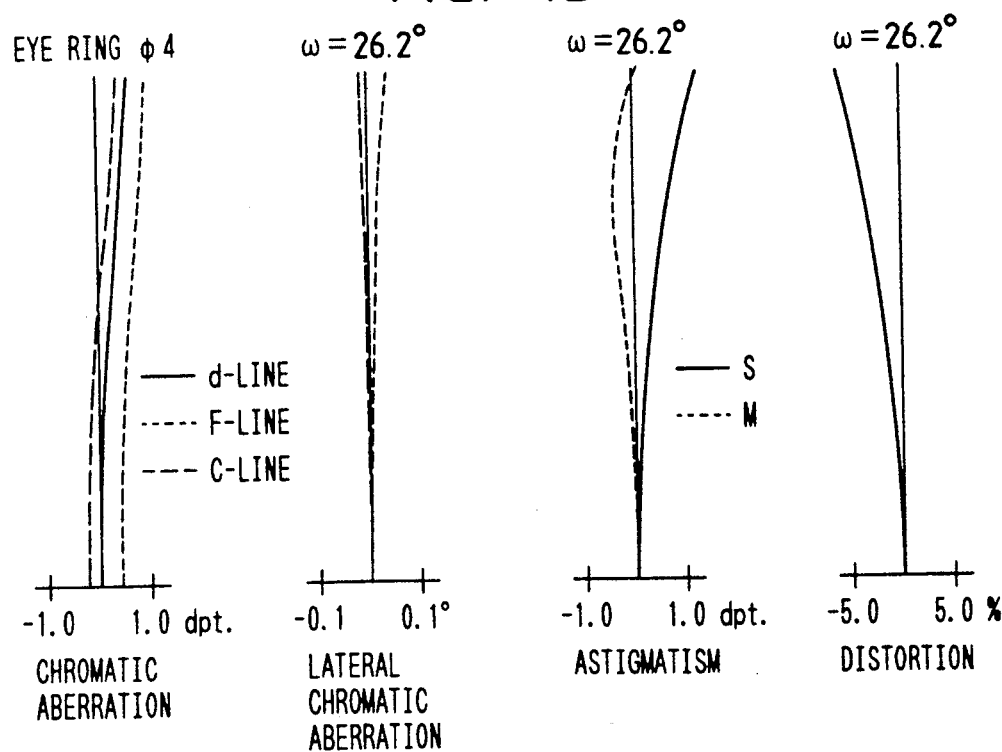
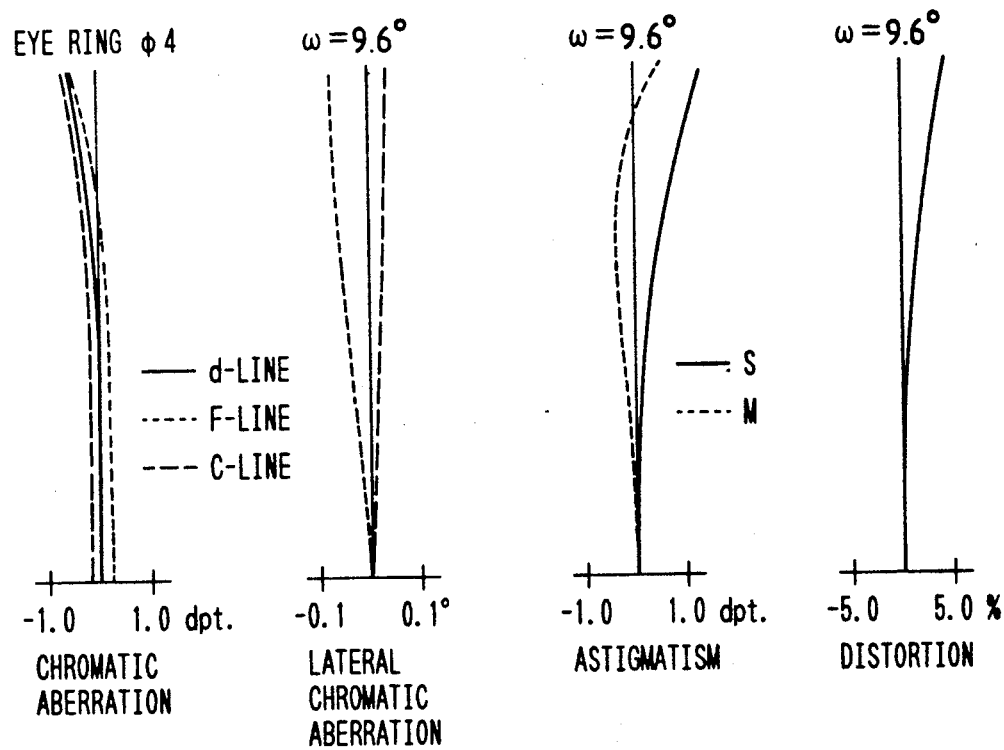

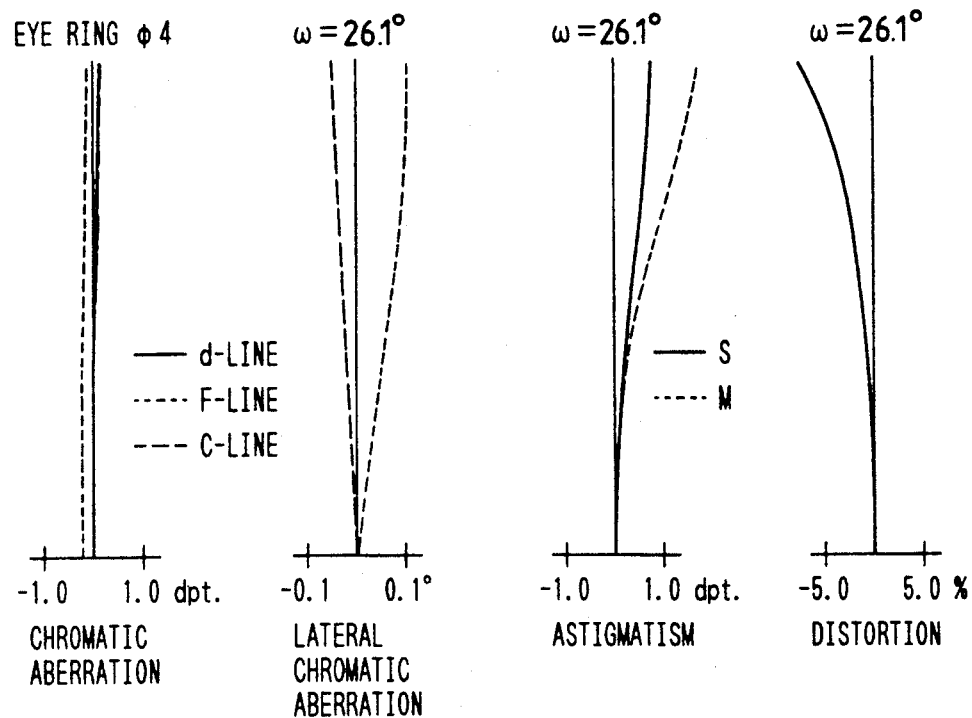
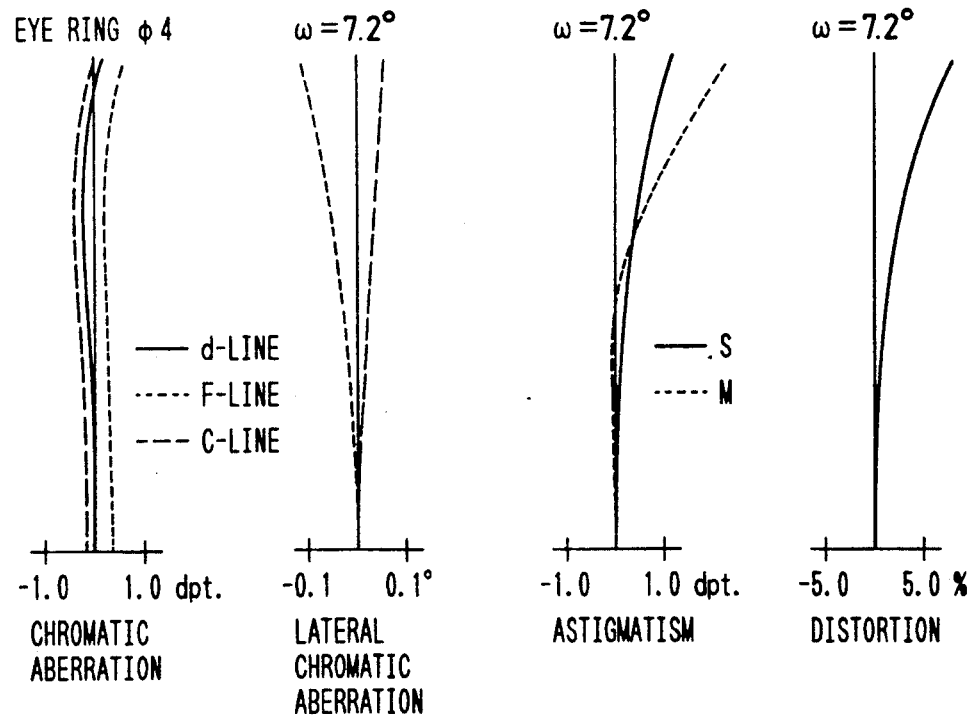

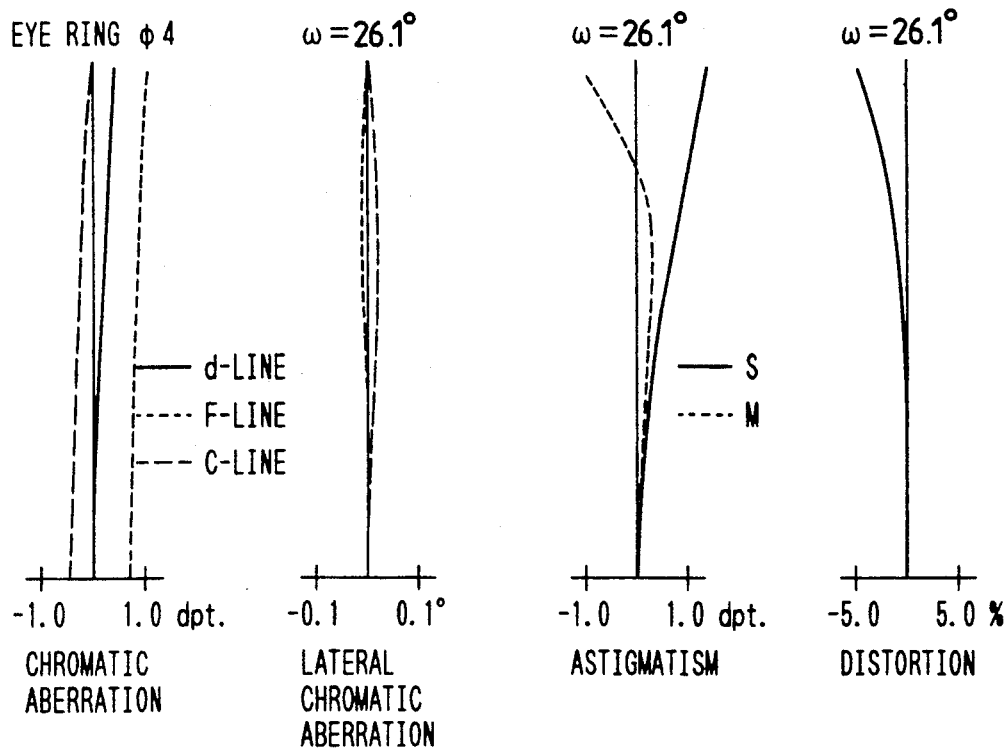
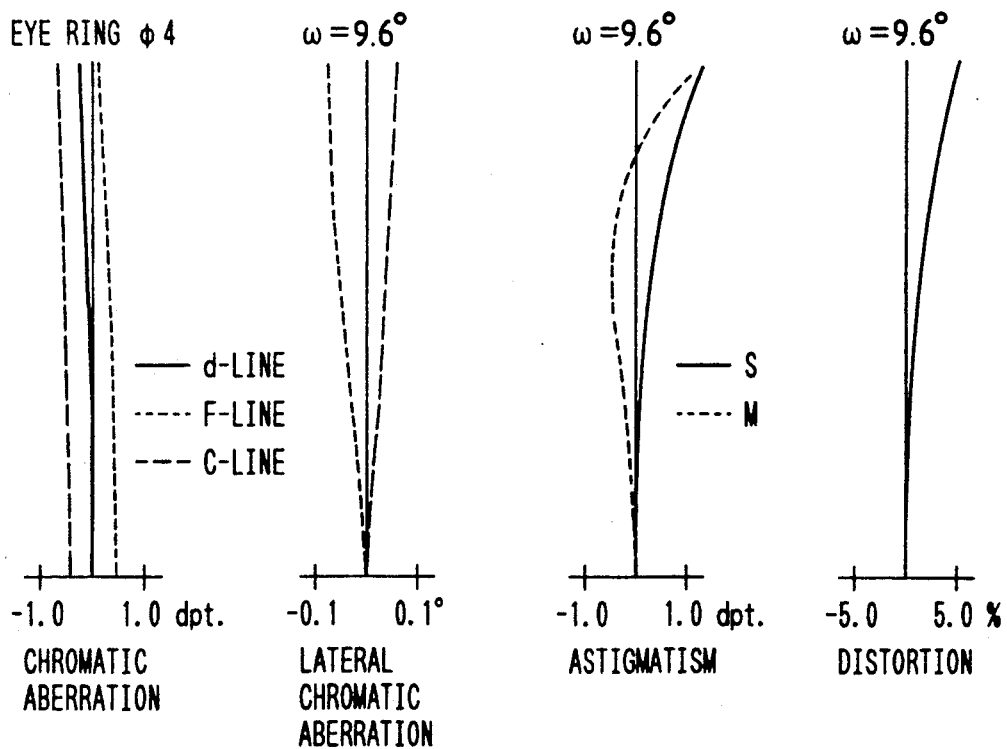

FIG. 43
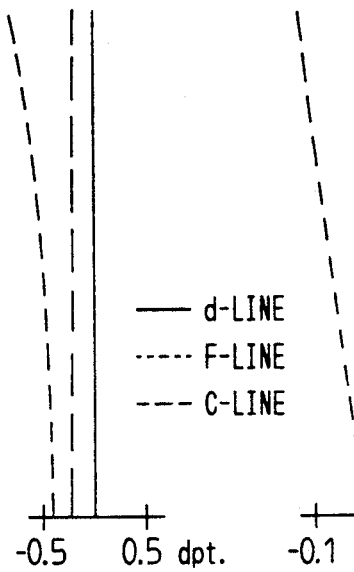
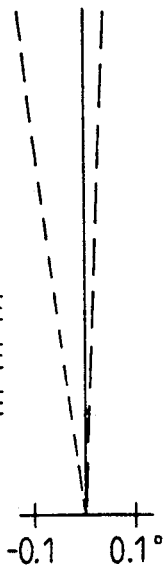
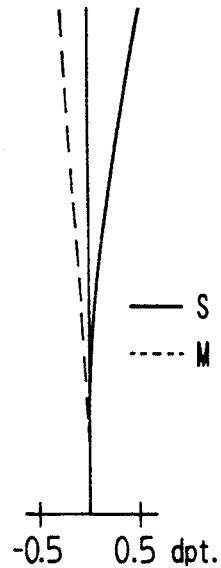
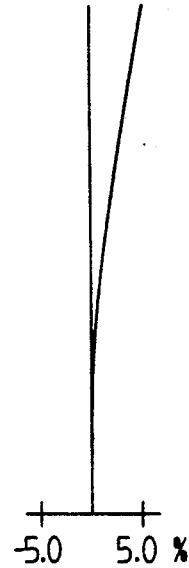
FIG. 44
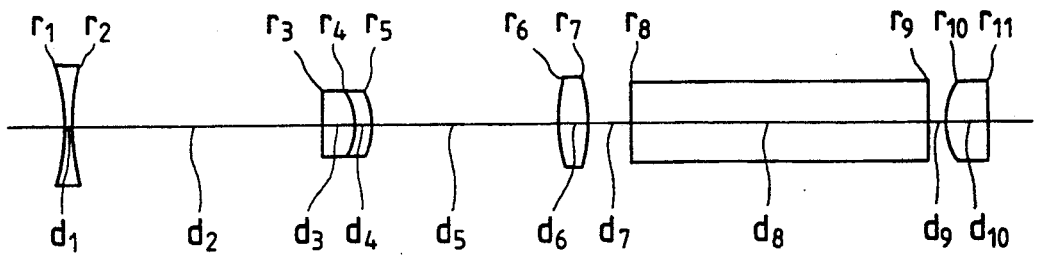

REAL IMAGE TYPE FINDER HAVING CEMENTED LENS WITH AT LEAST ONE RESIN LENS ELEMENT

CROSS-REFERENCE TO THE RELATED APPLICATION

This application is a continuation-in-part application of U.S. Ser. No. 426,655 now U.S. Pat. No. 4,992,809 filed Oct. 26, 1989.

BACKGROUND OF THE INVENTION

The present invention relates to improvements of a finder for a camera of the type in which an image pick-up system and a finder system are separately installed, such as a lens shutter camera and a video camera.

In this type of camera, an inverse Galilean finder in which an object is viewed by a virtual image has been widely used.

With the trend of reducing the size of a camera body, the camera using a zoom lens of high variable power in the image pick-up system has been proposed. In the camera, a zoom finder of high variable power and with less variation of aberration due to the zooming operation is required for the finder system.

For the above reasons, a finder of a real image type has recently become known, which has a brighter field of view and a higher magnification than the inverse Galilean finder, and can clearly recognize a field frame.

A conventional real image type finder is described in Japanese Patent Unexamined Publication Nos. 61-156018 and 64-65519, for example.

In the finder described in the above-mentioned publications, a chromatic aberration is unsatisfactorily compensated for, so that undesired colors will become more remarkable at larger magnifications. It is therefore a problem to simply increase the magnification.

The following measures are possible to compensate for the chromatic aberrations by using a glass lens. A first measure is to use optical material of high index of refraction and low dispersion. A second measure is to use an achromatic lens consisting of a cheap positive lens element made of optical material of low index of refraction and low dispersion and a negative lens element made of optical material of high dispersion.

In the former measure, cost to manufacture is increased. In the latter measure, the refractive power of the positive lens is increased. The radius of curvature of the face of lens becomes small. This brings about disadvantages, e.g., total reflection occurs on the rear face of the lens and aberrations are very sensitive to an error of mounting the lens to a lens frame.

Also, in view of the compactness, it is preferable to reduce the overall length of the finder system as much as possible. However, since the finder system having a short physical length with a high zoom ratio has increased powers of both the objective and ocular systems, increased chromatic aberration and spherical aberration occur.

In particular, in case of the zoom finder, if the overall length is decreased, the amount of movement of the moving groups is decreased. Accordingly, it is necessary to increase a refractive power of the moving groups in order to increase the zoom ratio. As a result, the chromatic aberration and spherical aberration would become noticeably worse.

SUMMARY OF THE INVENTION

Accordingly, the present invention has an object to provide a real image type finder which is free from the total reflection on the rear face of the positive lens and the excessive sensitivity of the aberrations to the error of mounting the lens to the frame even where the lens used is low in cost and the positive lens has a high power, and can satisfactorily compensate for chromatic aberrations.

Another object of the present invention is to provide a view finder whose overall length is short with a high zoom ratio or a high magnification ratio, and which may satisfactorily correct the chromatic aberration.

To achieve these and other objects, a real image type finder according to the invention has an arrangement that at least one cemented lens is provided, and of the lens components constituting said cemented lens, at least one lens component is made of resin.

In a real image type finder according to the invention, of the lens components constituting said cemented lens, at least one lens component is made of material of high transmittance to ultraviolet rays.

In a real image type finder according to the invention, lens components of low transmittance to ultraviolet rays are disposed in front and to the rear of said cemented lens.

Of the lens components constituting said cemented lens, at least one lens component is provided with a means for receiving adhesive squeezed out of said cemented lens.

The cemented lens is provided with a positioning structure to align the optical axes of said lens components.

The cemented lens is provided with a fixing structure to fix said lens components constituting the cemented lens along the optical axis from both sides of the cemented lenses.

According to the invention, in cementing together the lens components, their faces of large radii of curvature are made to contact with each other. Accordingly, reflection of light is reduced on the faces. Further, use of inexpensive material for the lens components is allowed. Chromatic aberrations of the resultant cemented lens are minimized.

The lens component of resin, when heated, is deteriorated, and changes color. This fact dictates against use of thermally cured adhesive for the cementing of the lens components. Because of this, ultraviolet (UV) cured adhesive is used. Generally, optical resin contains an ultraviolet blocking substance to prevent it from retrogradation of aging by ultraviolet rays. Accordingly, in the case of the cemented lens components made of resin, if the UV-cured adhesive is used for cementing them, it is impossible to completely harden the adhesive. Because of this, the lens components once cemented are prone to separate from each other.

In the arrangement of this invention, an adhesive layer may be irradiated with ultraviolet rays through at least the lens component of large ultraviolet transmittance. Accordingly, the adhesive may be hardened even if it is of the UV-cured type.

In the arrangement of this invention, when the cemented lens is assembled as a finder, ultraviolet rays do not reach the cemented lens. Accordingly, if the lens components are made of resin not containing a UV-blocking substance, those are free from retrogradation of aging.

In the arrangement of this invention, when adhesive is squeezed out of the fringes of the lens components during the cementing process, the squeeze-out adhesive is received by the receiving means, and will not hinder the mounting of the lens to the lens frame.

In the arrangement of the invention, the positioning structure provides an easy alignment of the optical axes of the lens components.

In the arrangement of the invention, the fixing structure holds the positioned and cemented lens components as they are, without any special jig.

In the zoom finder having the construction described above, the objective optical system desirably may satisfy conditions (1)–(3) set forth below, and it is also desirable for the eyepiece optical system to satisfy condition (4) to be set forth below:

$$0.4 < N_2 < 0.9 \quad (1)$$

$$|100/f_4| < 3.0 \quad (2)$$

$$2.2 < f_1/f_s < 3.5 \quad (3)$$

$$0.375 < r_{e1}/f_e < 0.6 \quad (4)$$

where $N_2$: the zoom ratio of the second lens group as compared to the zoom ratio of the objective optical system;

$f_i$: the focal length of the ith lens group;

$f_s$: the focal length of the objective optical system at wide-angle end;

$f_e$: the focal length of the eyepiece optical system; and $r_{e1}$: the radius of curvature of the first surface of the eyepiece optical system.

According to another aspect of the invention there is provided a zoom finder comprising an objective optical system having a positive overall power and an eyepiece optical system having a positive overall power, said objective optical system comprising, in order from the object side, a first lens group having a positive power, a second lens group having a negative power, and a third lens group having a positive power, the image formed by said objective optical system being focused in the neighborhood of the first surface of said eyepiece optical system, said second and third lens groups being moved to effect zooming with the eyesight through the finder being held constant.

In this zoom finder, the objective optical system may satisfy at least the following conditions (1) and (3):

$$0.4 < N_2 < 0.9 \quad (1)$$

$$2.2 < f_1/f_8 < 3.5 \quad (3)$$

BRIEF DESCRIPTION OF THE DRAWINGS

FIGS. 9, 12, 15, 18, 21, 24, 27, 30 and 33 are graphs plotting the aberration curves obtained at the wide-angle end with the finder apparatus constructed according to Examples 1–9, respectively;

FIGS. 10, 13, 16, 19, 22, 25, 28, 31, 34 are graphs plotting the aberration curves obtained at the telephoto end with the finder apparatus constructed according to Examples 1–9, respectively;

FIGS. 41 to 43 show a third embodiment of a real image type finder according to the present invention, in which an arrangement of a lens system of the finder is shown in FIG. 41, graphs showing aberrations at the wide angle end are shown in FIG. 42, and graphs showing aberrations at the telescopic end are shown in FIG. 43;

FIGS. 44 to 46 show a fourth embodiment of a real image type finder according to the present invention, in which an arrangement of a lens system of the finder is shown in FIG. 44, graphs showing aberrations at the wide angle end are shown in FIG. 45, and graphs showing aberrations at the telescopic end are shown in FIG. 46; and FIGS. 47A and 47B to FIGS. 51A and 51B show diagrams of modifications of the cemented lens.

DESCRIPTION OF THE PREFERRED EMBODIMENTS

Figure 1:
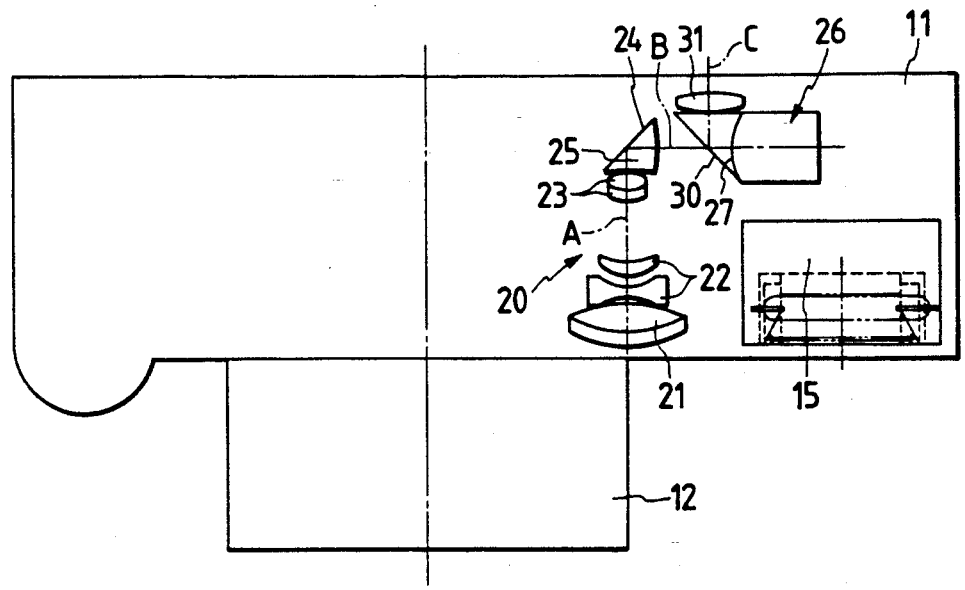
FIG. 1 is a plan view of a lens-shutter camera using the finder apparatus of the present invention.
Figure 2:
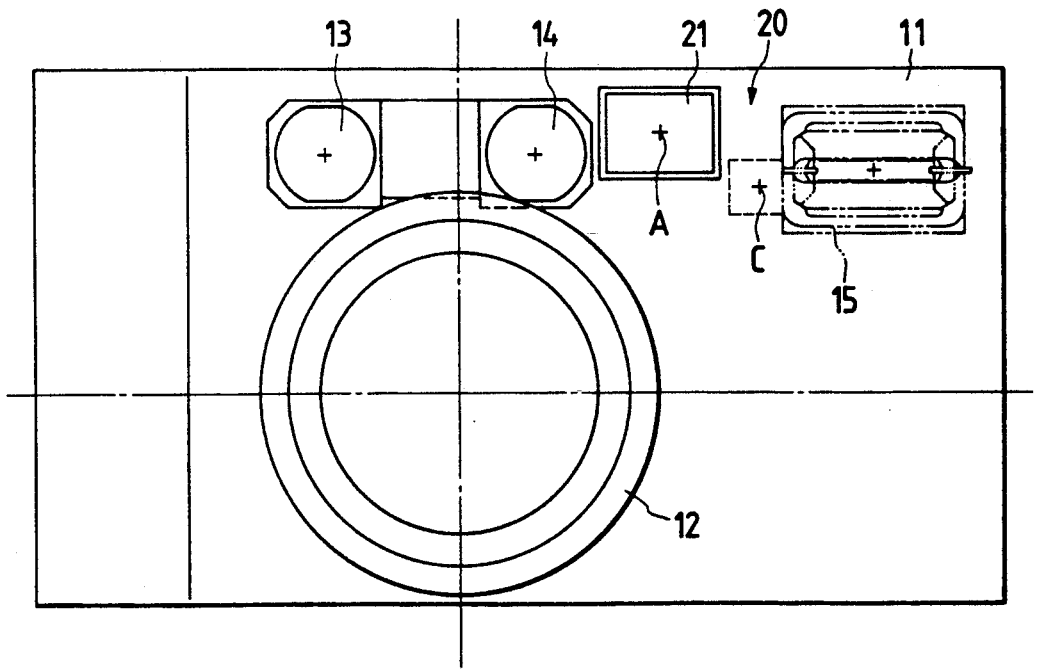
FIG. 2 is a front view of the same camera.
Figure 3:
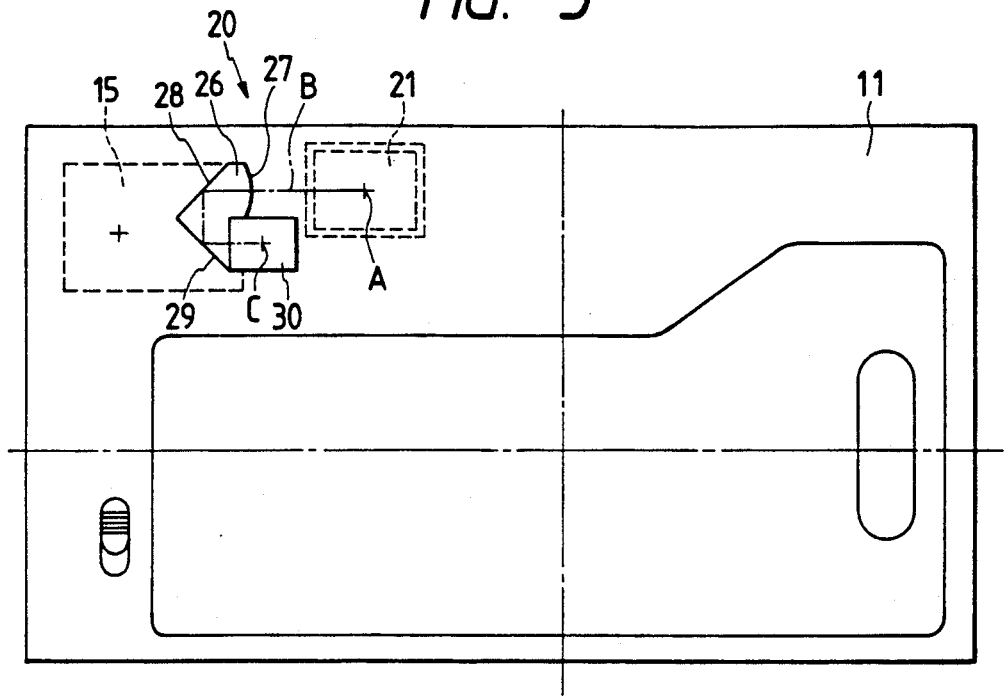
FIG. 3 is a rear view of the same camera.
Figure 4:
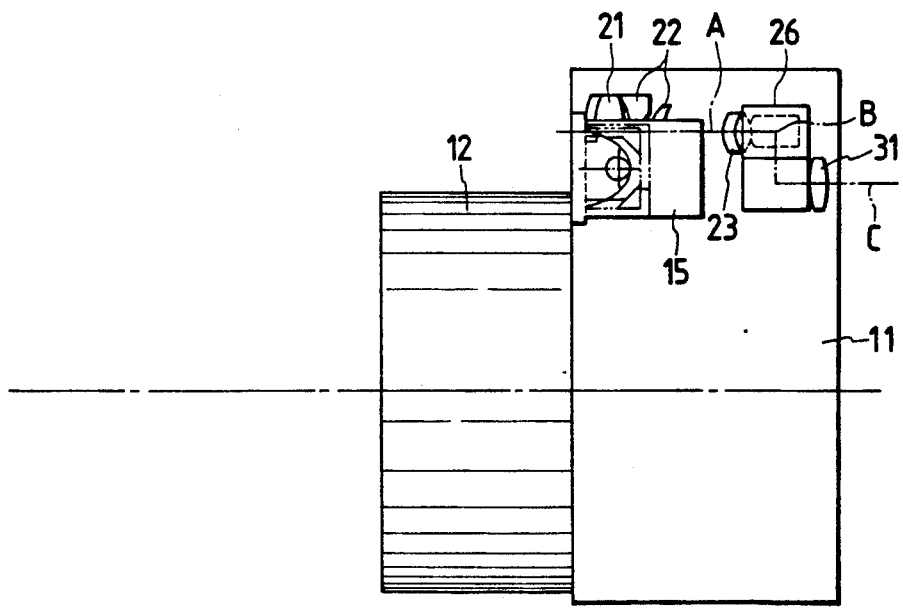
FIG. 4 is a side view of the same camera.

The present invention is described hereinafter with reference to the accompanying drawings.

FIGS. 1–4 show the general appearance of a lens-shutter type camera having a real-image zoom finder apparatus 20 constructed in accordance with the present invention. The camera body indicated by 11 has a zoom imaging lens 12 in its generally central portion, and the light-emitting portion 13 and light-receiving portion 14 of a range-finding meter are disposed on the left and right sides above the zoom imaging lens 12. The camera body 11 also has a zoom electronic flash device 15 in the upper right portion as seen looking into its front face.

The real-image zoom finder apparatus which is the characteristic feature of the present invention is disposed in the space left available in part of the area behind the zoom electronic flash device 15. The objective lens 21 in the real-image zoom finder apparatus 15 is disposed inward and adjacent to this flash device 15. Zooming lens groups 22 and 23 and a prism 25 having a first reflecting face 24 are located in the entrance path A along the optical path of the objective lens 21. The first reflecting face 24 of the prism 25 deflects the entrance path A by 90 degrees to form a refraction path B.

Behind the flash device 15, a prism 26 integral with a lens, both being made of resin molding, is disposed on the refraction path B. This prism 26 has a lens surface 27, a second reflecting face 28, a third reflecting face 29 and a fourth reflecting face 30. The second reflecting face 28 reflects the rays from refraction path B downward; the third reflecting face 29 reflects the rays of reflected light from face 28 in a direction parallel to refraction path B; and the fourth reflecting face 30 reflects the rays of reflected light from face 29 to travel along the exit path C which is parallel to the entrance path A. An eyepiece 31 is located on the exit path C.

The image of a subject formed by the combination of objective lens 21 with zooming lens groups 22 and 23 is focused on the lens surface 27 and inverted and reversed right and left by means of the second reflecting face 28, third reflecting face 29 and fourth reflecting face 30 for viewing through the eyepiece 31. The finder frame is depicted on the lens surface 27.

As described above, the real-image zoom finder apparatus 20 of the present invention is so designed that its optical path is routed behind the zoom electronic flash device 15 and this enables the necessary optical path length to be insured without designing the camera body 11 to have a special configuration as in the prior art. Further, the zooming lens groups 22 and 23 are disposed in the entrance path A that can be made fairly longer than the other optical paths and this is effective in attaining a high zoom ratio, say 3 or more.

Figure 5:
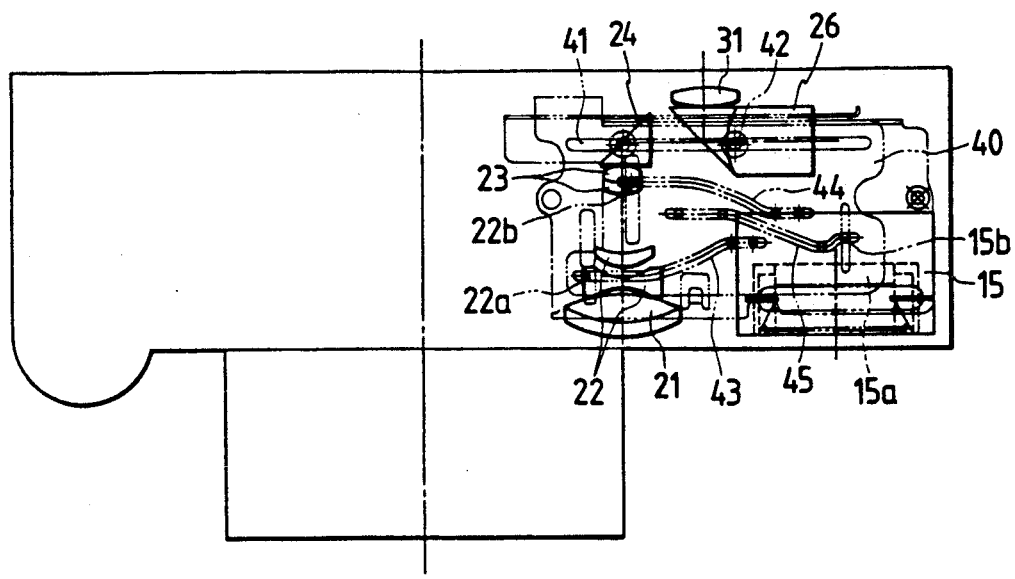
FIG. 5 is a plan view showing an example of the mechanism for driving the zoom finder apparatus and electronic flash device shown in FIGS. 1–4.
Figure 6:
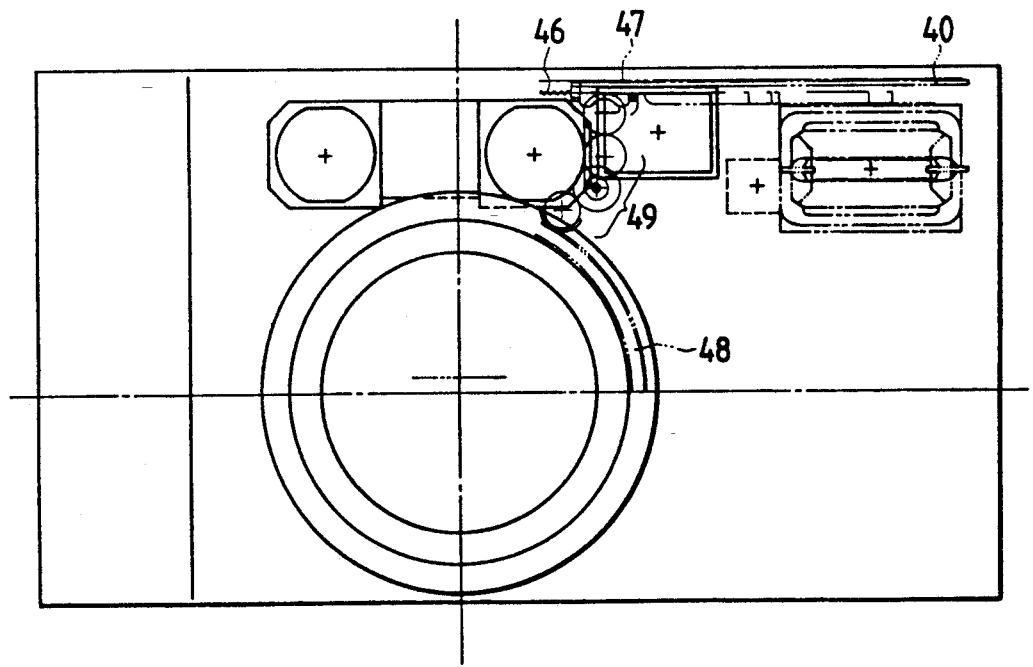
FIG. 6 is a front view of said mechanism.
Figure 7:
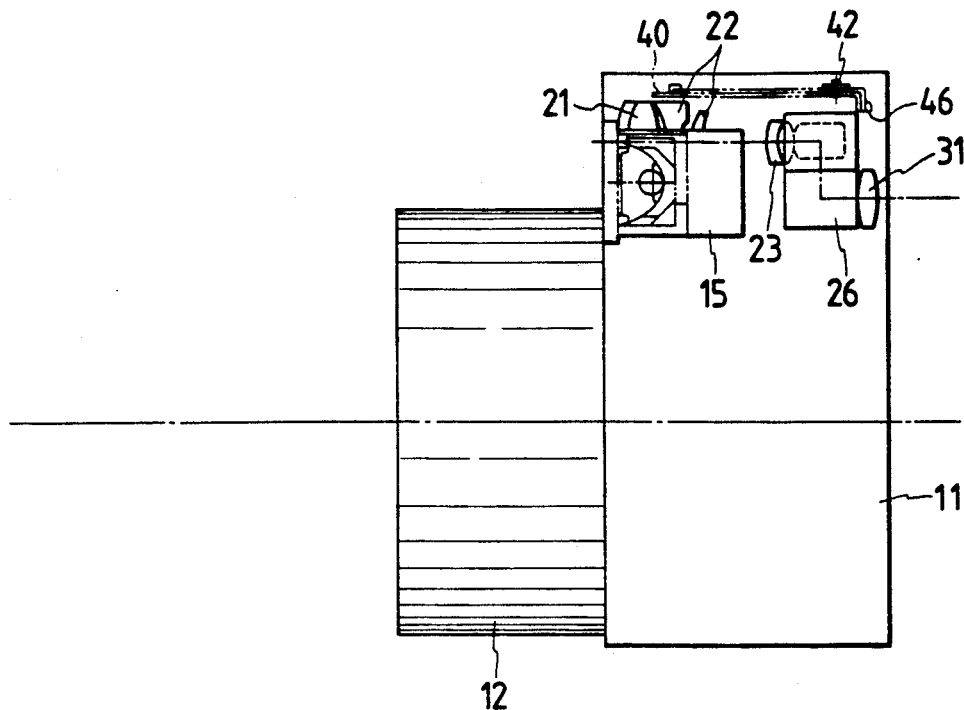
FIG. 7 is a side view of said mechanism.

The mechanism for driving the zooming lens groups 22 and 23 is described below with reference to FIGS. 5-7. On top of the zoom electronic flash device 15 and real-image zoom finder apparatus 20, a place cam plate 40 is disposed in such a way that it is movable laterally by means of a guide groove 41 and a guide pin 42. This plane cam plate 40 has formed therein cam grooves 43, 44 and 45 through which are respectively inserted a pin 22a fixed to the support frame of the zooming lens group 22, a pin 22b fixed to the support frame of the zooming lens group 23 and a pin 15b fixed to the movable light-emitting unit 15a of the electronic flash device 15. The movable light-emitting unit 15a consists of a unitary assembly of a xenon flash tube 15c and a reflector. The angle of illumination with the electronic flash will change if the unit 15a moves toward or away from the subject to the imaged.

The plane cam plate 40 has a rack 46 formed at its rear end, and a pinion 47 that meshes with this rack 46 is rotationally driven via a gear 48 fixed to the cam ring on the zoom imaging lens 12 and a gear train 49 in mesh with this gear 48. The cam ring on the zoom imaging lens 12 is rotationally driven to effect zooming with said lens. Thus, the plane cam plate 40 will move from right to left or vice versa when zooming is effected with the lens 12, and the zooming lens groups 22 and 23 are moved in the direction of the optical axis as guided by cam grooves 43 and 44 so as to insure that the scene to be imaged will coincide with the visual field of the finder. Further, the angle of illumination with the electronic flash is varied in accordance with the viewing angle by moving the light-emitting unit 15a as guided by the cam groove 45.

The foregoing description assumes that the present invention is applied to a silver salt photographic camera but it should be understood that the present invention is also applicable to a video still camera.

As described on the foregoing pages, the finder apparatus of the present invention for use with a lens-shutter type camera makes use of the space in the area behind a commonly employed electronic flash device in such a way that the optical path is routed in that area to insure the necessary optical path length. This enables the construction of a real-image zoom finder apparatus having high zoom ratio without increasing the overall thickness of the camera body. Consequently, a lens-shutter type camera having high zoom ratio can be produced using the traditional and hence easy-to-handle camera configuration.

If the zooming lens groups are disposed in the entrance optical path which can be made longer than other paths, the zoom finder apparatus can be constructed in an easy way. If the optical element to be disposed behind the electronic flash device is formed of a resin molded article in which a lens is made integral with a prism, the added advantage of space saving can be attained. The lens and the prism may be integrated, and this unitary assembly of lens and prism is also effective in increasing the optical path length.

The optical system layout of the present invention which is applicable to the foregoing zoom finder is described hereinafter with reference to FIG. 8 which shows Example 1 of the present invention.

Figure 8:
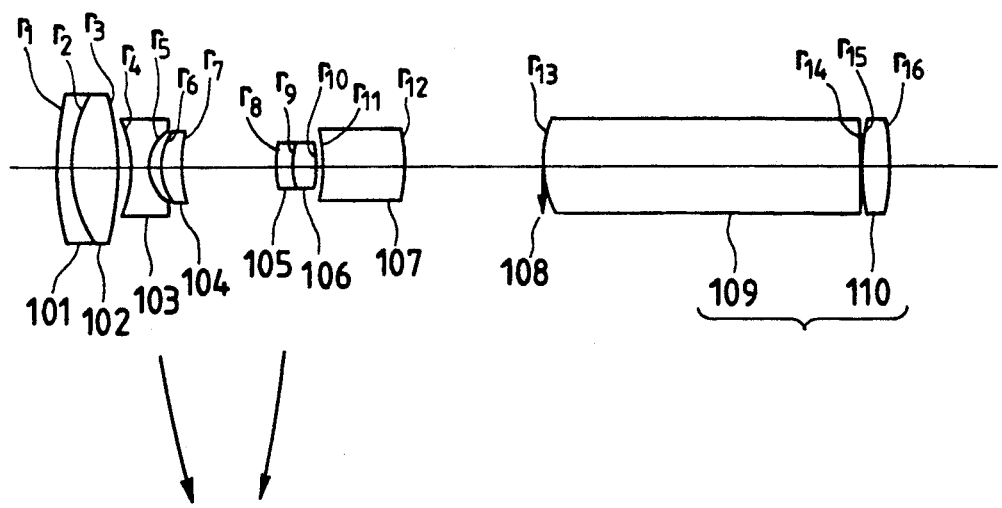
FIGS. 8, 11, 14, 17, 20, 23, 26, 29 and 32 are schematic cross-sectional views of finder apparatus constructed according to Examples 1–9, respectively, of the present invention.
Figure 9:
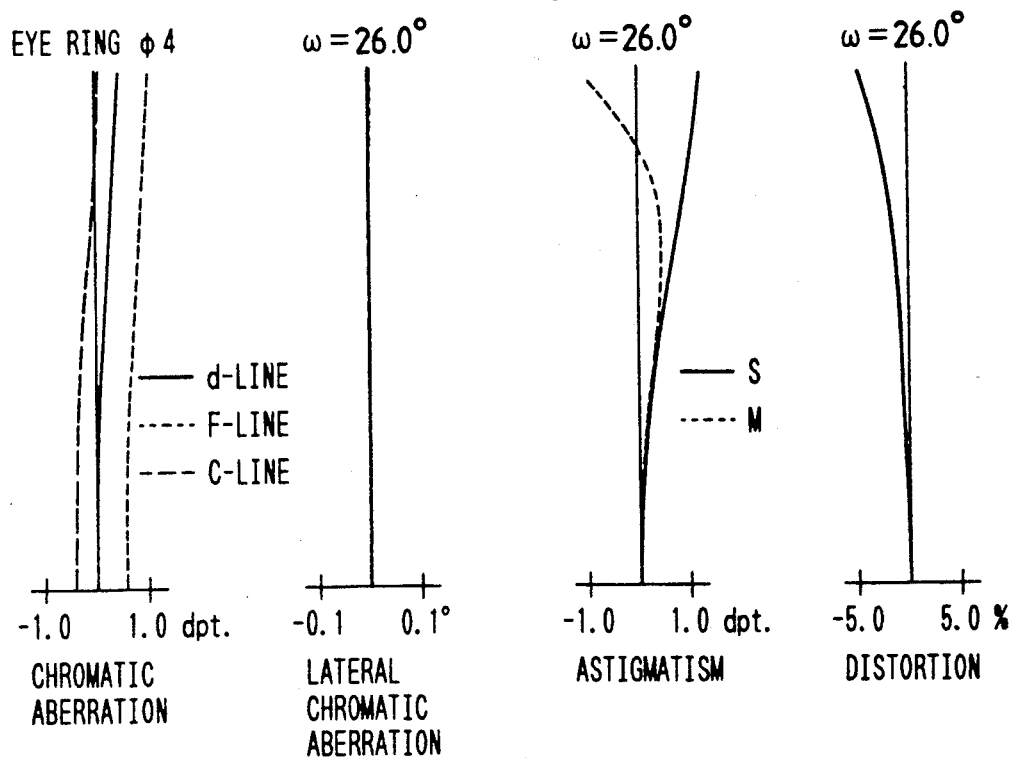
Figure 10:
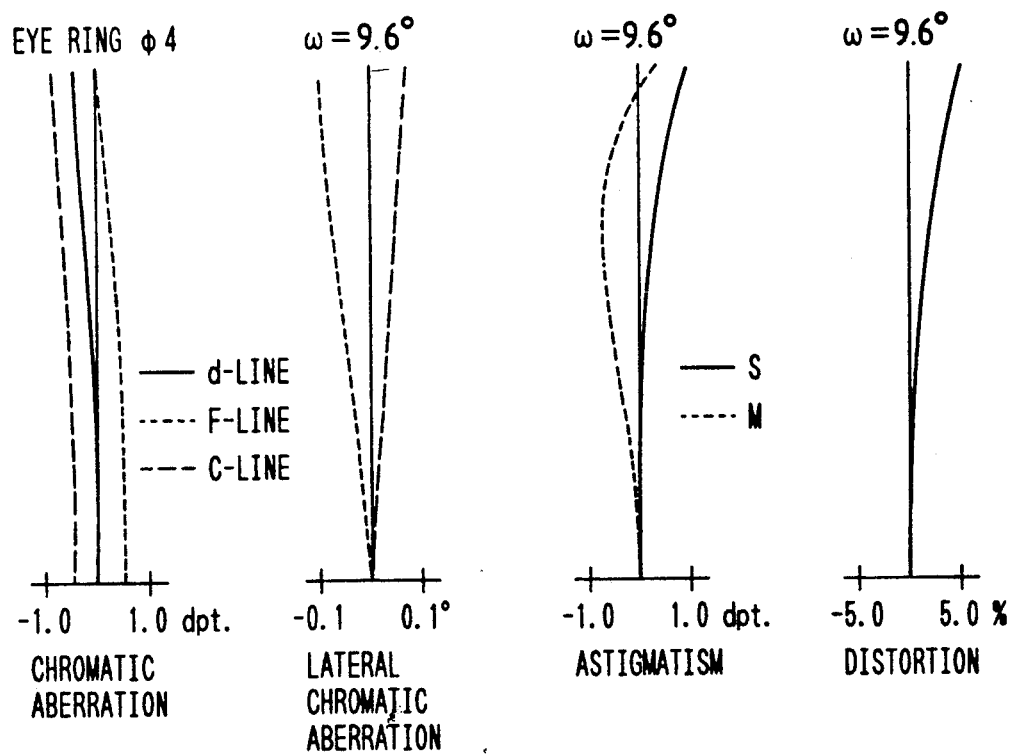
Figure 11:
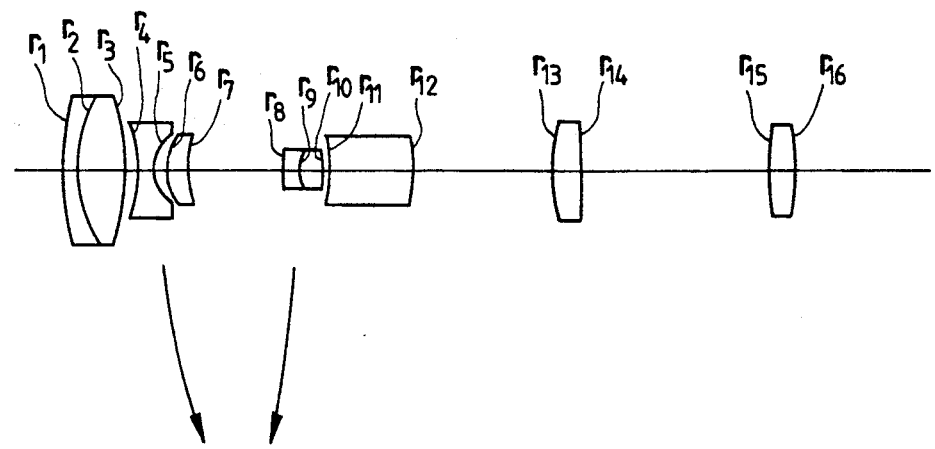
Figure 12:
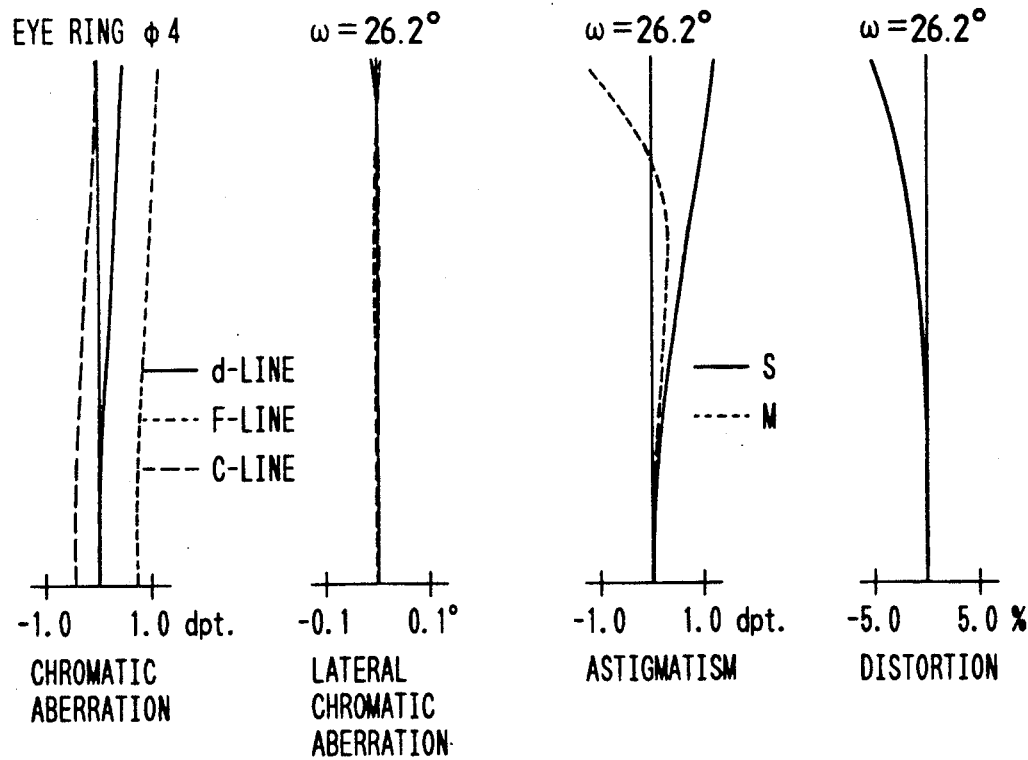
Figure 13:
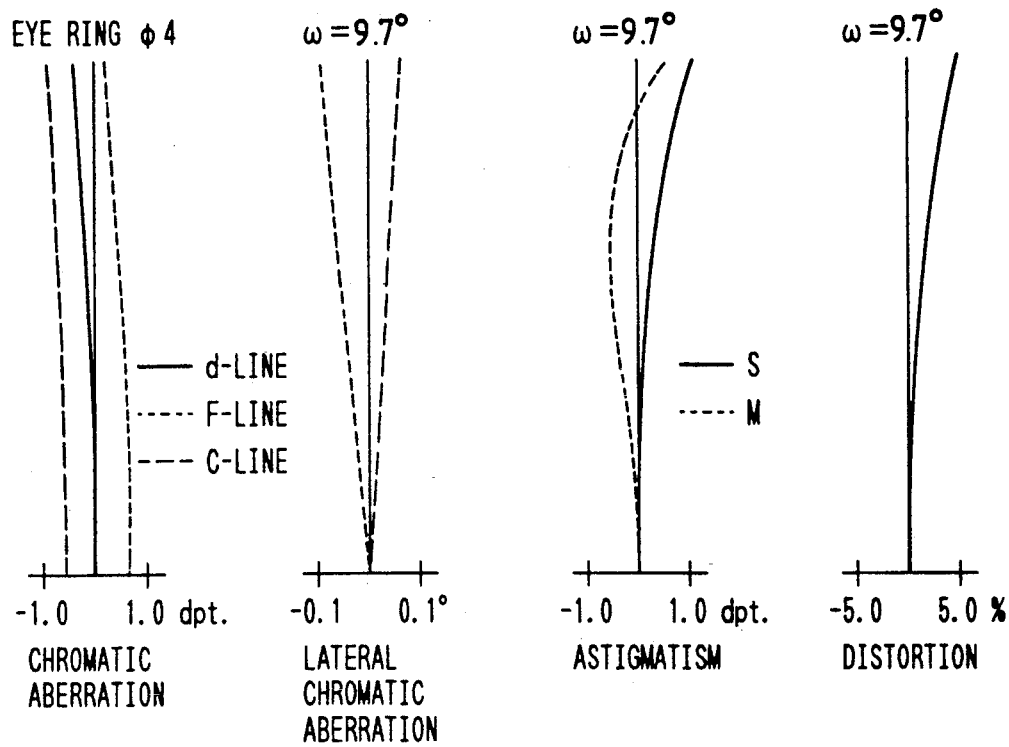
Figure 14:
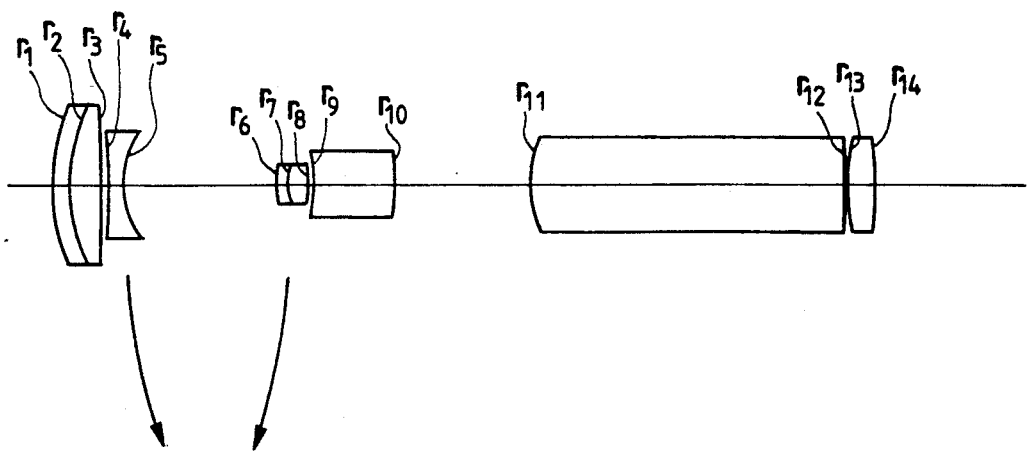
Figure 17:
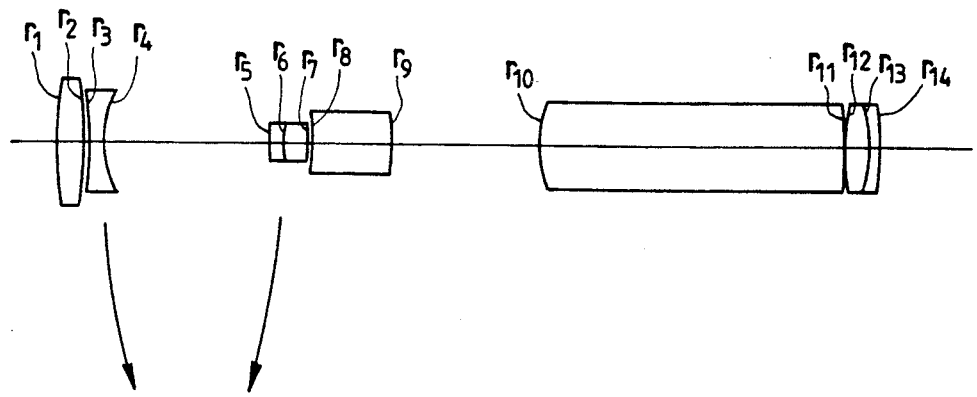
Figure 18:
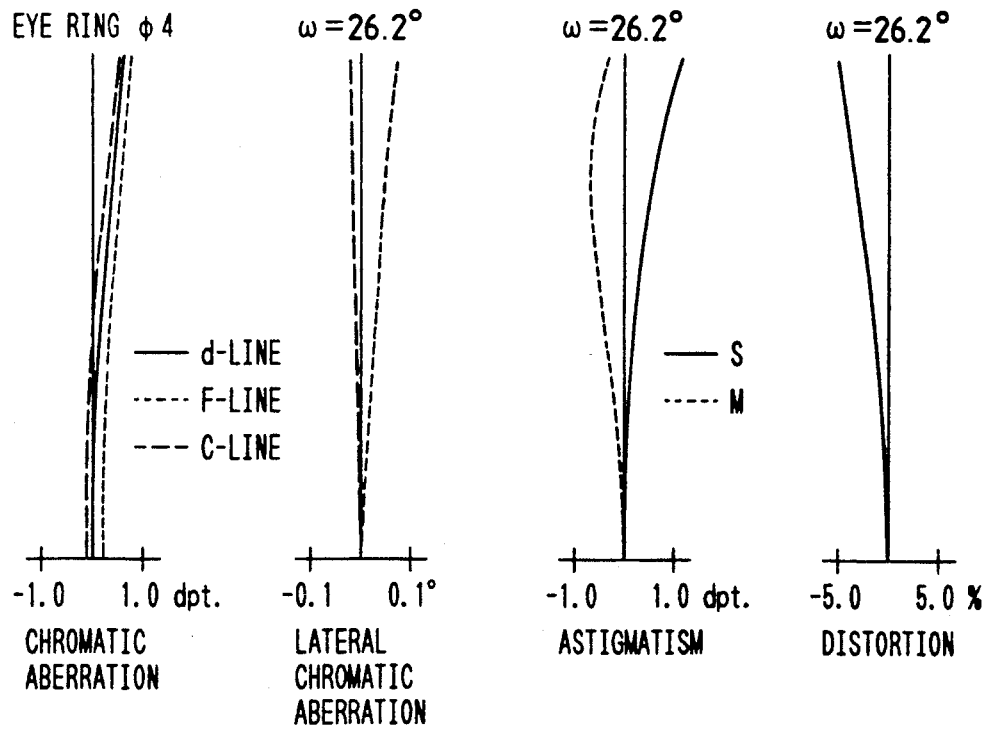
Figure 19:
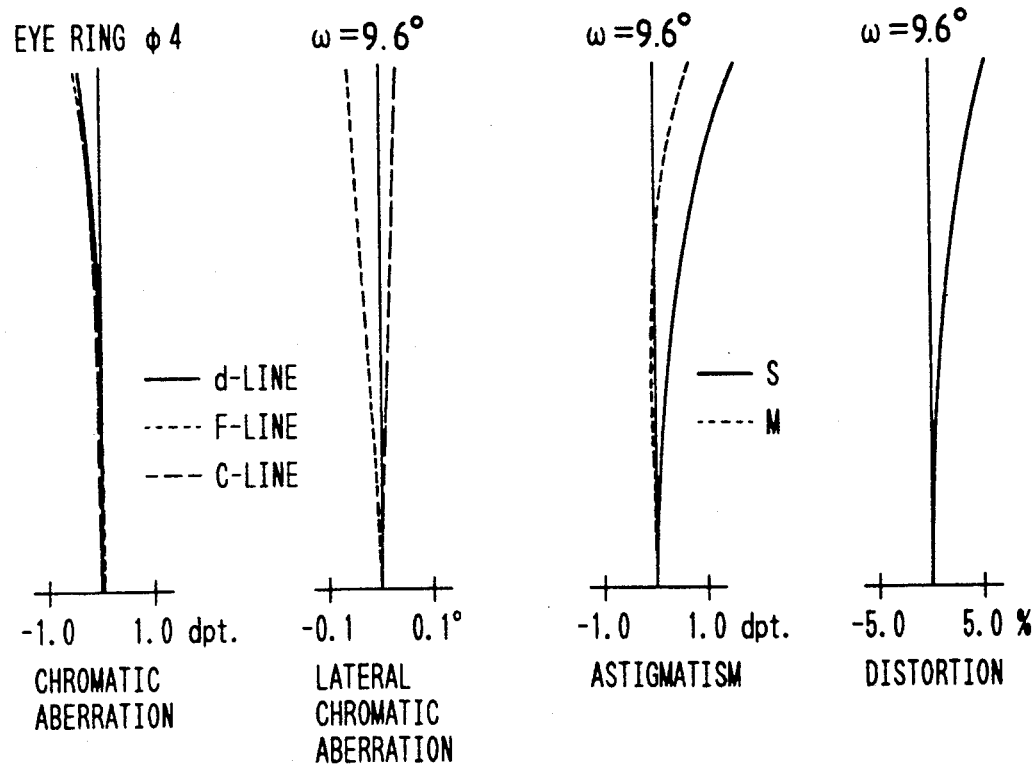
Figure 20:
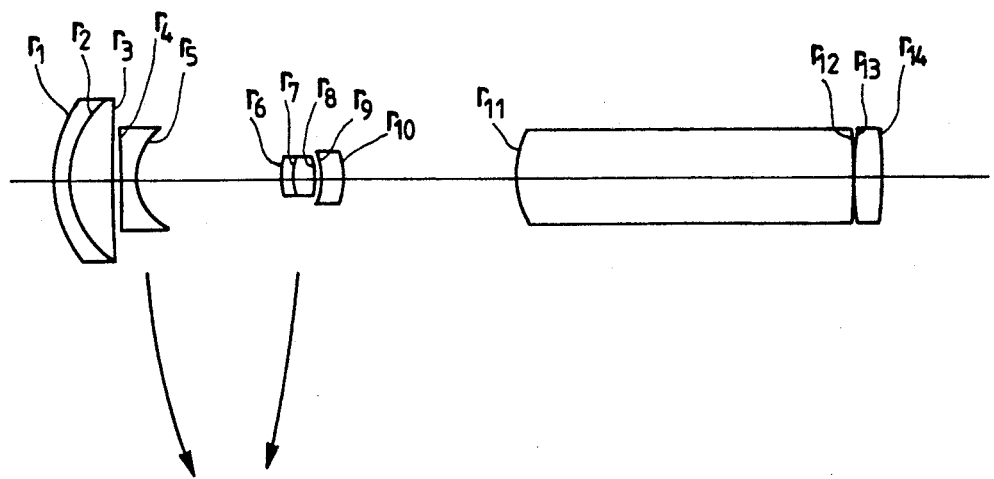
Figure 21:
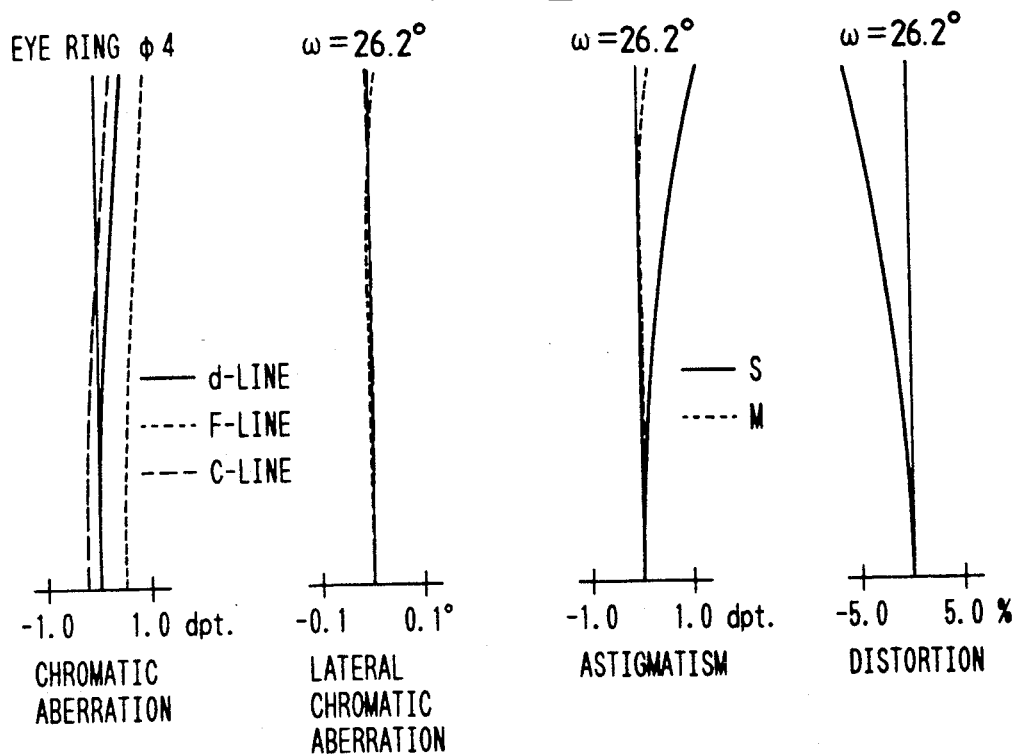
Figure 22:
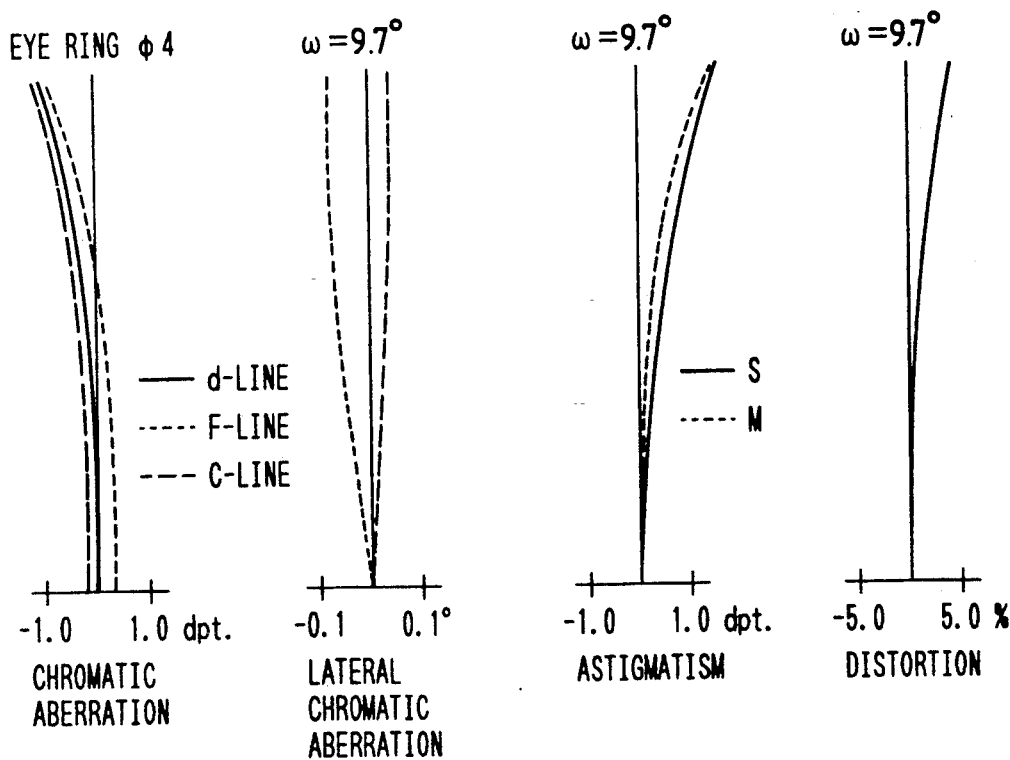

In FIG. 8, numerals 101 to 107 denote lens groups that make up an objective optical system having a positive overall power; 101 and 102 are lenses that form a first lens group having a positive power, 103 and 104 are lenses that form a second lens group having a negative power, 105 and 106 are lenses that form a third lens group having a positive power, and 107 is a fourth lens group having a weak power. Shown by 108 is an image formed by the objective optical system and which is focused in the neighborhood of the first surface of the eyepiece optical system. Numerals 109 and 110 collectively refer to the eyepiece optical system having a positive overall power. In the example shown in FIG. 8, a Porro prism 109 is used to erect the image 108 formed by the objective optical system. For the sake of simplicity, the Porro prism 109 is shown as a flattened glass block.

The optical layouts shown in FIGS. 11, 14, 17, 20, 23 and 26 need not be described in detail since one will readily understand them in the light of the above explanation of the layout shown in FIG. 8.

Figure 23:
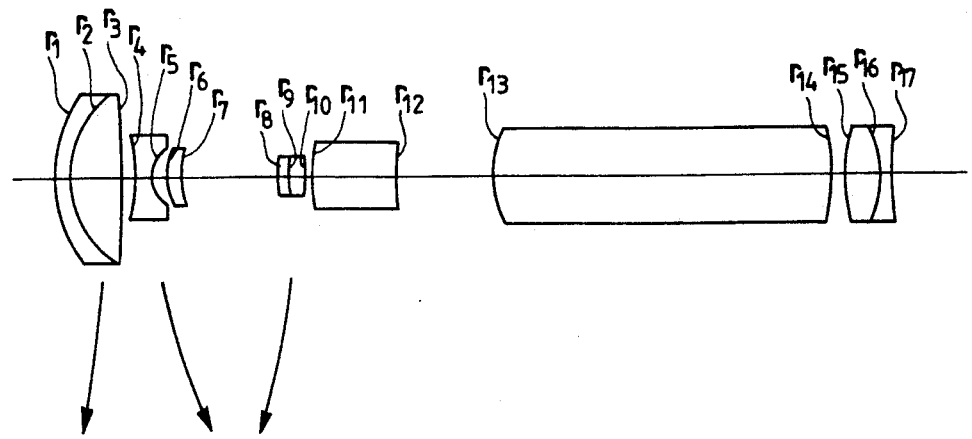
Figure 24:
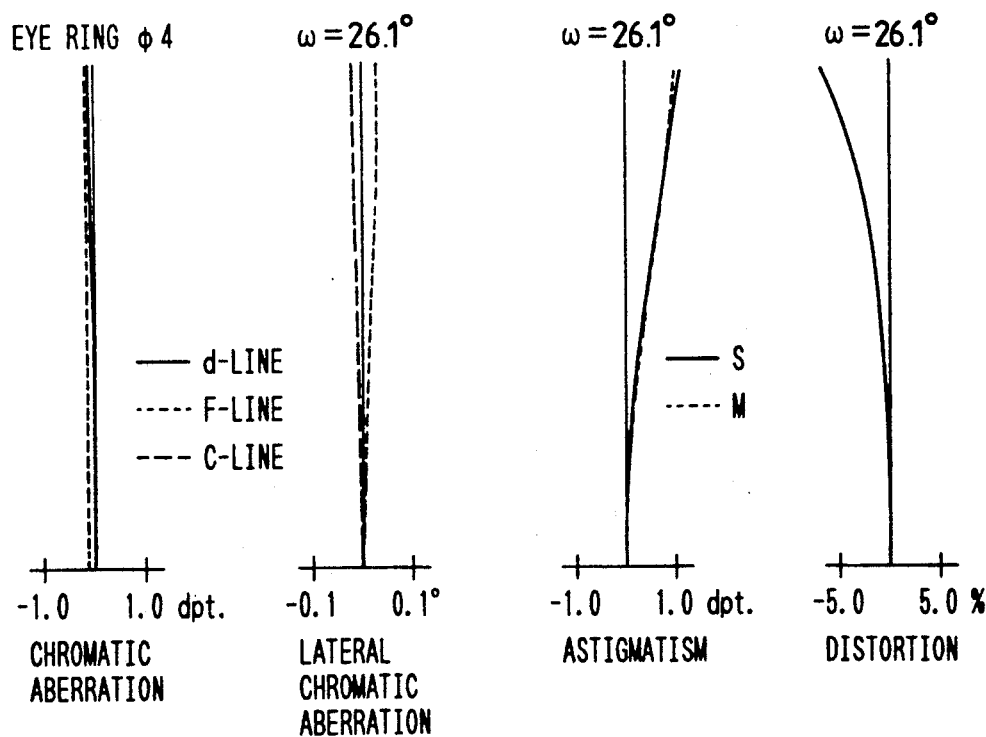
Figure 25:
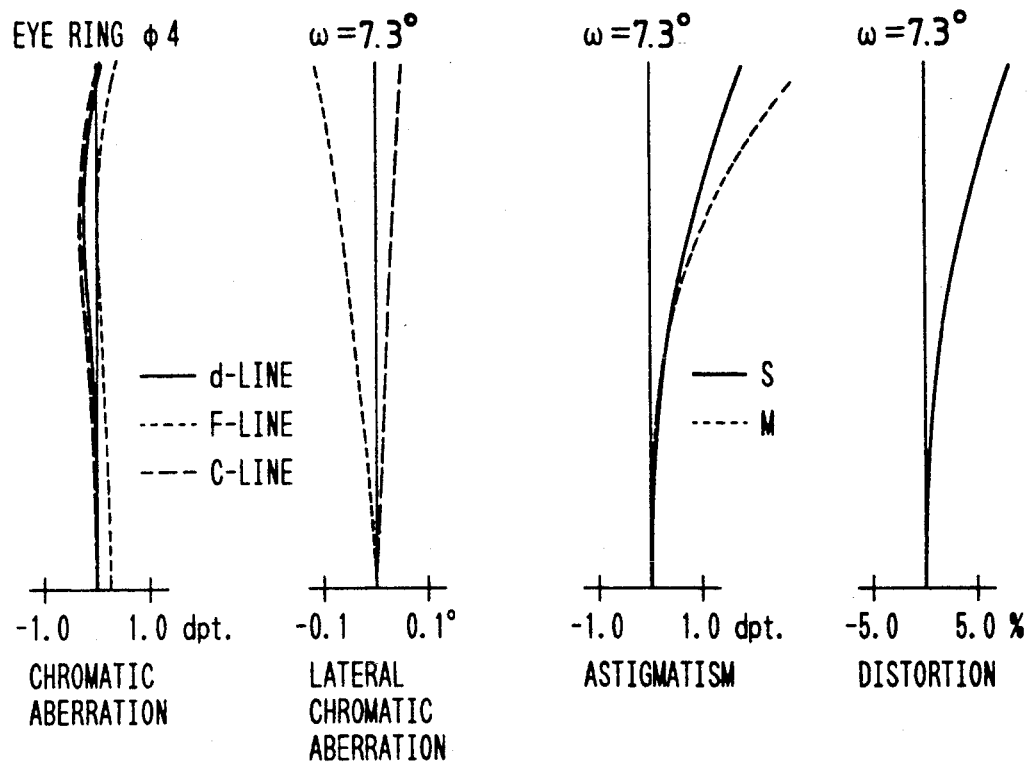
Figure 26:
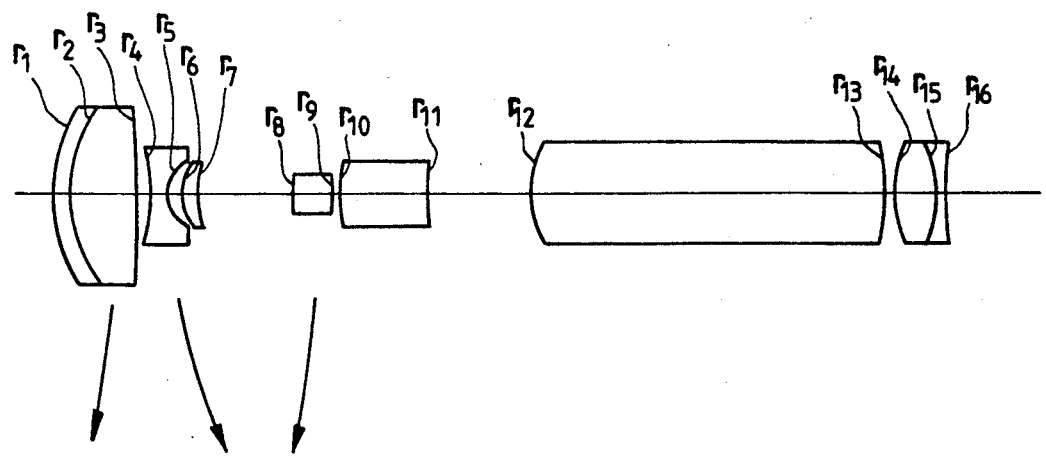
Figure 29:
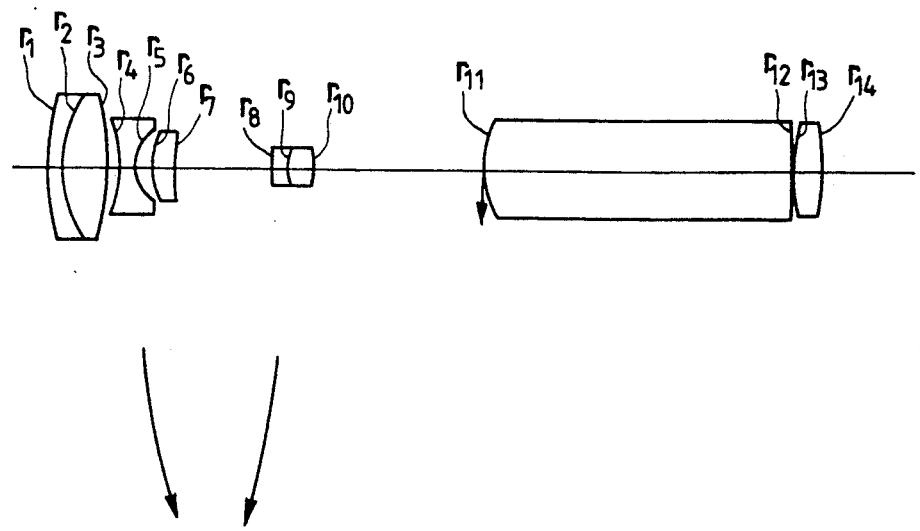
Figure 30:
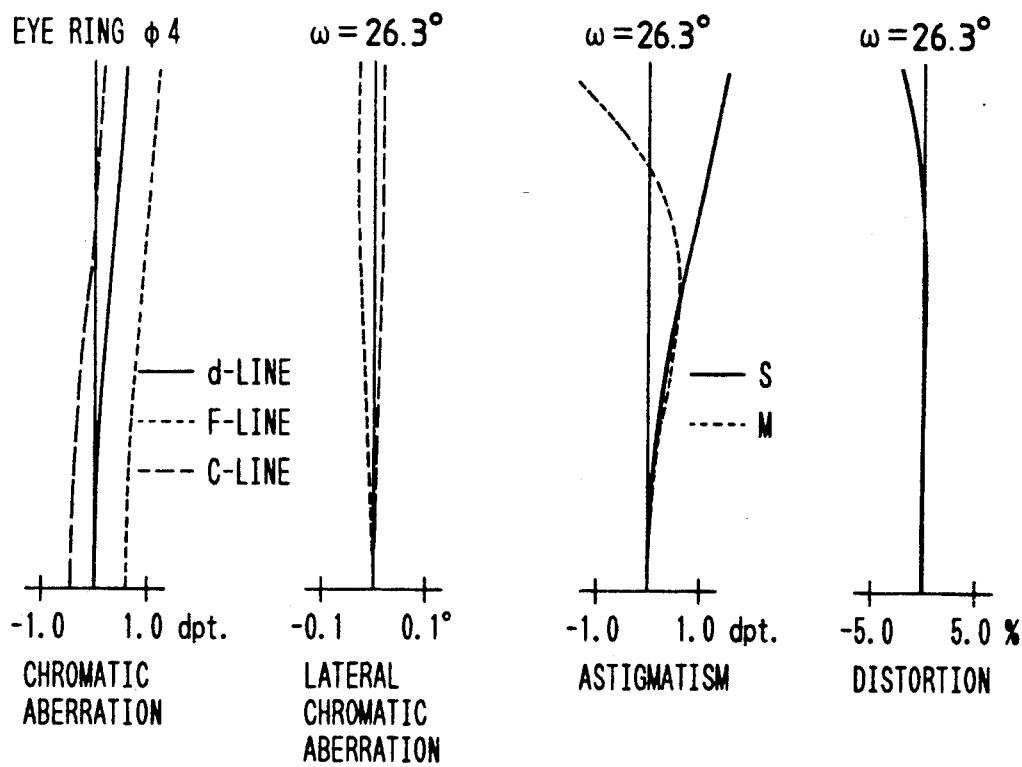
Figure 31:
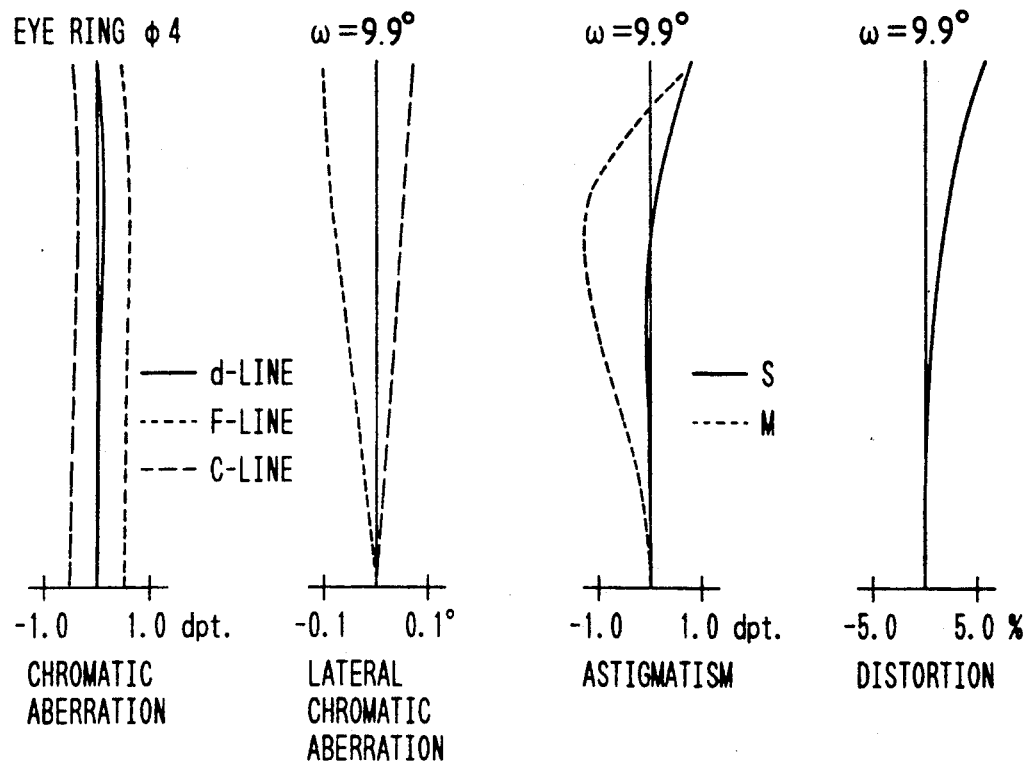
Figure 32:
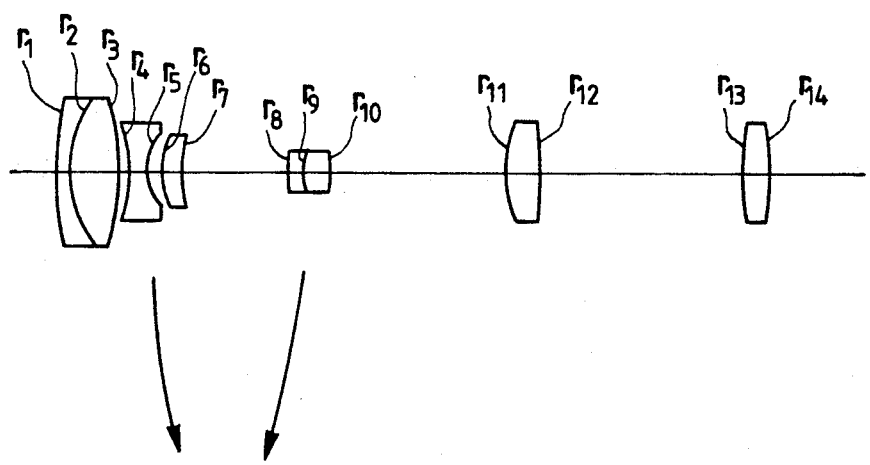

In the finder apparatus of the present invention, the second and third lens groups are moved in the directions indicated by arrows in FIGS. 8, 11, 14, 17, 20, 29 and 32 (Example 1-5 and 8 and 9) so as to effect zooming while correcting the change of eyesight through the finder that will occur upon zooming. This enables a high zoom ratio to be attained by the finder with minimum aberrational variations due to zooming. An even higher zoom ratio can be obtained if the first lens group is also moved as shown in FIGS. 23 and 26 (Example 6 and 7).

In order to form an exit pupil on an appropriate position behind the eyepiece (indicated by 110 in FIG. 8) of the eyepiece optical system, it is generally required that a condenser lens be positioned in the neighborhood of the focal point of the objective optical system. In the present invention, the first surface of the eyepiece system is provided with a curvature to serve as a condenser lens.

While a Porro prism is typically used to erect the image viewed through the finder, other erecting systems may be used such a the combination of a condenser lens and a mirror, or an image reversing relay lens system. In some applications such as astronomical telescopes, means for reversing the image are not necessary at all.

In most of the examples of the present invention set forth herein, the fourth lens group is simply made of a single lens element of large thickness. If desired, such a thick single lens (e.g. lens 107 in FIG. 8) may be replaced by an isosceles right triangular prism which is combined with subsequent optical members to form an image erecting optical system as shown in FIG. 1. Also, alternatively, an isosceles right triangular prism may be disposed between the third lens group and an eyepiece optical system. This arrangement is effective in achieving further reduction in the overall length of the system.

If at least one of the surfaces of the system of the present invention is rendered aspheric, compensation for aberrations such as distortion, astigmatism, spherical aberration and coma can be easily accomplished. Further, lenses may be made of resin materials and this offers the advantage that lenses of a desired shape can be easily fabricated.

The conditions that are to be satisfied by the finder apparatus of the present invention are described below.

Condition (1) relates to the degree of zooming that should be effected by the second lens group. If the focal length of the first lens group is written as $f_1$, the magnifications of the second and third lens groups at the wide-angle end as $m_{2W}$ and $m_{3W}$, respectively, the magnifications of the second and third lens groups at the telephoto end as $m_{2T}$ and $m_{3T}$, respectively, and the magnification of the fourth lens group as $m_4$, then the following relationships are established between the set of these parameters and $f_W$ (the focal length of the objective optical system as the wide-angle end) or $f_T$ (the focal length of the objective optical system at the telephoto end):

$$f_W = f_1 \cdot m_{2W} \cdot m_{3W} \cdot m_4 \quad \text{(i)}$$

$$f_T = f_1 \cdot m_{2T} \cdot m_{3T} \cdot m_4 \quad \text{(ii)}$$

If the zoom ratios of the objective optical system, the second lens group and the third lens group are respectively written as $Z$, $Z_2$ and $Z_3$, they may be expressed as follows from equations (i) and (ii):

$$Z = \frac{f_T}{f_W} = \frac{m_{2T}}{m_{2W}} = \frac{m_{3T}}{m_{3W}} = Z_2 \cdot Z_3 \quad \text{(iii)}$$

By taking the logarithms of both sides of equation (iii), it is rewritten as:

$$\log Z = \log Z_2 + \log Z_3 \quad \text{(iv)}.$$

Let us here introduce parameters $N_2$ and $N_3$ as defined below:

$$\frac{\log Z_2}{\log Z} = N_2 \quad \text{(v)}$$

$$\frac{\log Z_3}{\log Z} = N_3 \quad \text{(vi)}$$

where $N_2 + N_3 = 1$. By using $N_2$ and $N_3$, the degrees of zooming effected by the second and third lens groups as compared with zooming by the objective optical system can be expressed.

Thus, the degrees of zooming effected by certain movable lens groups in a zoom lens system as compared with zooming by the overall system can be expressed by equations (v) and (vi). Condition (1) relates to $N_2$ defined by equation (v) which may be properly adjusted to attain an increased zoom ratio of the second lens group by the finder while preventing undue increase in the overall length of the objective optical system. In a zoom lens system of a type that adopts the construction of the objective optical system of the present invention, the second and third lens groups are typically used as a variator and a compensator, respectively, and $N_2$ is nearly equal to unity. In this case, the second lens group is solely responsible for zooming by the zoom lens system and in order to attain a high zoom ratio, the second lens group must be moved by such a great amount that it becomes impossible to attain the purpose of reducing the overall length. Condition (1) sets forth the requirement that must be satisfied in order to shorten the overall length of the system by reducing the zoom ratio of the second lens group and making the third lens group also responsible for zooming. If the upper limit of this condition is exceeded, the movement of the second lens group becomes too great to shorten the overall length of the system. If the lower limit of the condition is not reached, the movement of the third lens group becomes excessive, also making it impossible to shorten the overall length of the system.

Condition (2) sets forth the requirement that must be satisfied in order to control the curvature of field of the objective optical system by properly adjusting the power of the fourth lens group. If often occurs with such cameras as lens-shutter cameras and video cameras that restraints by the mechanical setup introduce difficulty in compensating for the curvature of field of the eyepiece optical system. To cope with this problem, the field curvature of the objective optical system must be brought into agreement with that of the eyepiece optical system so that the difference in eyesight between the center and the marginal area of the visual field of the finder can be corrected. By adjusting the power of the fourth lens group in such a way that condition (2) is satisfied, the Petzval sum of the objective optical system can be controlled to achieve agreement between its field curvature and that of the eyepiece optical system. If this condition is not met, the field curvature of the objective optical system becomes so great as to cause an excessive difference in eyesight between the center and the marginal area of the visual field of the finder.

Condition (3) sets forth the requirement that must be satisfied in order to properly adjust the focal length of the first lens group so that a higher zoom ratio can be attained by the finder while preventing excessive increase in the overall length of the objective optical system. The focal length of the first lens group is closely related to the overall length of the objective optical system and the zoom ratio that can be attained. If the focal length of the first lens group is increased, the overall length of the objective optical system also increases. If the focal length of the first lens group is shortened, the movement of the second lens group becomes too small to attain a high zoom ratio. If the upper limit of condition (3) is exceeded, the overall length of the objective optical system becomes excessive. If the lower limit of this condition is not reached, the movement of the second lens group becomes too small to attain the desired zoom ratio.

Condition (4) relates to the radius of curvature of the first surface of the eyepiece optical system. In order to construct a Porro prism or like device to erect the image viewed through the finder and to minimize the size of the eyepiece optical system, the effective aperture of the eyepiece optical system is desirably made small with respect to its overall length. In addition, it is necessary to insure a long eye relief. For these reasons, it is desired that nearly parallel rays of light pass through the interior of the eyepiece optical system. The finder apparatus of the present invention is designed to have a magnification of about 1.5 at the telephoto end. In this case, $f_L$, or the focal length of the objective optical system at the telephoto end is $1.5 f_e$. Further, in order to make a compact objective optical system while maintaining good optical performance, the distance (t) from the exit pupil of the objective optical system to the first surface of the eyepiece optical system is desirably in the range of from about $0.5 f_L$ to about $0.8 f_L$. Given these values, the eyepiece optical system permits the passage of parallel rays of light if the refractive power of the first surface of the eyepiece optical system is $1/t$. Hence, the following relationship is established:

$$\frac{(n-1)}{r_{e1}} = \frac{1}{t}$$

Wherein n is the refractive index of the optical member on the object side of the eyepiece optical system. If n is nearly equal to 1.5, this equation can be rewritten as $r_{e1} = 0.5 \, t$. Since $0.5 \, f_L < t < 0.8 \, f_L$ and $f_L = 1.5 \, f_{e1}$ condition (4) can be derived by substituting $r_{e1} = 0.5 \, t$ and $f_L = 1.5 \, f_e$ into the relationship $0.5 \, f_L < t < 0.8 \, f_L$. If the upper limit of this condition is exceeded, the rays of light passing through the interior of the eyepiece optical system will spread so broadly that the size of the eyepiece optical system becomes excessive. If the lower limit of this condition is not reached, the rays of light passing through the eyepiece optical system will converge so much that not only does it become impossible to insure a long eye relief but excessive coma will also develop.

EXAMPLES

Seven examples of the present invention are described below with reference to data sheets, in which $2\omega$ denotes the real visual field of the finder covering both the wide-angle and telephoto ends, $r_i$, the radius of curvature of the ith surface, $d_i$, the aerial distance between the ith surface and the (i+1)th surface, and $n_i$ and $\nu_i$, the refractive index at the d-line and the Abbe number, respectively, of the optical member between the ith and (i+1)th surfaces.

The geometry of an aspheric surface may be expressed by the following well-known formula:

$$X = \frac{CY^2}{1 + \sqrt{1 - (1+K)C^2Y^2}} + A_4 Y^4 + A_6 Y^6 + A_8 Y^8$$

In the following data sheets, omission of asphericity coefficient data indicates a zero value for the coefficient. Also, in each example the term "eye ring" means a diameter of an exit pupil, with the term $\phi$ indicating a diametrical dimension. Throughout the examples, it should be noted that lenses having $n_i$ of 1.58547 are made of polycarbonate and lenses having $n_i$ of 1.49186 are made of PMMA.

EXAMPLE 1

| Surface No. | $r_i$ | $d_i$ | $n_i$ | $\gamma_i$ |
|---|---|---|---|---|
| \multicolumn{5}{c}{$2\omega = 52.2° \sim 19.4°$  eye ring, 4 mm$^\phi$} |
| 1 | 20.441 | 1.50 | 1.58547 | 29.9 |
| 2 | 13.680 | 4.30 | 1.49186 | 57.4 |
| 3 | −20.132 | 1.02∼5.86 | | |
| 4 | −11.166 | 1.50 | 1.49186 | 57.4 |
| 5 | 3.008 | 1.12 | | |
| 6 | 5.175 | 2.05 | 1.49186 | 57.4 |
| 7 | 14.372 | 8.69∼0.50 | | |
| 8 | 9.600 | 1.50 | 1.58547 | 29.9 |
| 9 | 5.000 | 2.33 | 1.49186 | 57.4 |
| 10 | −6.930 | 0.50∼3.84 | | |
| 11 | −12.450 | 7.50 | 1.49186 | 57.4 |
| 12 | −12.000 | 12.20 | | |
| 13 | 10.154 | 28.03 | 1.49186 | 57.4 |
| 14 | ∞ | 0.20 | | |
| 15 | 20.982 | 2.55 | 1.49186 | 57.4 |
| 16 | −17.287 | | | |

Asphericity coefficient
Surface No. 1
$K = -0.67843531 \times 10^1$
Surface No. 3
$K = -0.11143750 \times 10^1$  $A_6 = 0.58584883 \times 10^{-6}$
Surface No. 5
$K = -0.87868797$  $A_6 = -0.30098075 \times 10^{-4}$
Surface No. 10
$K = -0.14044499 \times 10^1$  $A_6 = 0.20915375 \times 10^{-4}$
Surface No. 15
$K = -0.66340567 \times 10^1$  $A_6 = -0.24104055 \times 10^{-5}$
$N_2 = 0.540$  $100/f_4 = 0.962$
$f_1/f_s = 2.466$  $R_{e1}/f_6 = 0.509$ In Example 1, the first lens 101 and fifth lens 105 are polycarbonate, while the second lens 102 and sixth lens 106 cemented to the lenses 101 and 105, respectively, are PMMA.

EXAMPLE 2

| Surface No. | $r_i$ | $d_i$ | $n_i$ | $\nu_i$ |
|---|---|---|---|---|
| \multicolumn{5}{c}{$2\omega = 52.4° \sim 19.4°$  eye ring, 4 mm$^\phi$} |
| 1 | 20.962 | 1.50 | 1.58547 | 29.9 |
| 2 | 14.219 | 4.30 | 1.49186 | 57.4 |
| 3 | −19.705 | 1.01∼5.83 | | |
| 4 | −11.211 | 1.50 | 1.49186 | 57.4 |
| 5 | 3.044 | 1.12 | | |
| 6 | 5.186 | 2.05 | 1.49186 | 57.4 |
| 7 | 13.354 | 8.69∼0.50 | | |
| 8 | 9.811 | 1.50 | 1.58547 | 29.9 |
| 9 | 5.000 | 2.33 | 1.49186 | 57.4 |
| 10 | −6.821 | 0.50∼3.87 | | |
| 11 | −12.597 | 7.50 | 1.49186 | 57.4 |
| 12 | −12.000 | 12.20 | | |
| 13 | 10.901 | 2.72 | 1.49186 | 57.4 |
| 14 | −106.249 | 17.23 | | |
| 15 | 20.627 | 2.50 | 1.49186 | 57.4 |
| 16 | −17.687 | | | |

Asphericity coefficient
Surface No. 1
$K = -0.69853580 \times 10^1$
Surface No. 3
$K = -0.13458219 \times 10^1$  $A_6 = 0.58492920 \times 10^{-6}$
Surface No. 5
$K = -0.87121564$  $A_6 = -0.35108134 \times 10^{-4}$
Surface No. 10
$K = -0.14494918 \times 10^1$  $A_6 = 0.18628684 \times 10^{-4}$
Surface No. 15
$K = -0.66952880 \times 10^1$  $A_6 = -0.25469236 \times 10^{-5}$
$N_2 = 0.538$  $100/f_4 = 0.999$
$f_1/f_s = 2.482$  $R_{e1}/f_6 = 0.550$

EXAMPLE 3

| Surface No. | $r_i$ | $d_i$ | $n_i$ | $v_i$ |
|---|---|---|---|---|
| \multicolumn{5}{c}{$2\omega = 52.4° \sim 19.2°$ eye ring, 4 mm$^\phi$} | | | | |
| 1 | 17.021 | 1.50 | 1.80518 | 25.4 |
| 2 | 13.928 | 3.00 | 1.61800 | 63.4 |
| 3 | −234.166 | 0.66~7.82 | | |
| 4 | −62.863 | 1.50 | 1.80400 | 46.6 |
| 5 | 7.549 | 14.34~5.30 | | |
| 6 | 7.615 | 1.00 | 1.72825 | 28.5 |
| 7 | 3.820 | 2.00 | 1.53172 | 48.9 |
| 8 | −8.992 | 0.50~2.38 | | |
| 9 | −15.156 | 7.50 | 1.51633 | 64.1 |
| 10 | −14.842 | 12.23 | | |
| 11 | 9.950 | 29.14 | 1.51633 | 64.1 |
| 12 | ∞ | 0.20 | | |
| 13 | 17.428 | 2.50 | 1.53113 | 62.4 |
| 14 | −25.656 | | | |

Asphericity coefficient
Surface No. 1
$K = -0.56920582$
Surface No. 13
$K = -0.31055168 \times 10^1$        $A6 = 0.28376003 \times 10^{-6}$
$N_2 = 0.698$                         $100/f_4 = 0.658$
$f_1/f_s = 2.939$                     $R_{a1}/f_e = 0.495$

EXAMPLE 4

| Surface No. | $r_i$ | $d_i$ | $n_i$ | $v_i$ |
|---|---|---|---|---|
| \multicolumn{5}{c}{$2\omega = 52.4° \sim 19.2°$ eye ring, 4 mm$^\phi$} | | | | |
| 1 | 29.697 | 2.70 | 1.56873 | 63.1 |
| 2 | −41.744 | 0.44~8.11 | | |
| 3 | −44.160 | 1.50 | 1.80400 | 46.6 |
| 4 | 9.779 | 15.56~4.63 | | |
| 5 | 14.647 | 1.50 | 1.80518 | 25.4 |
| 6 | 5.000 | 2.30 | 1.66755 | 41.9 |
| 7 | −9.961 | 0.50~3.76 | | |
| 8 | −14.450 | 7.50 | 1.51633 | 64.1 |
| 9 | −14.521 | 14.14 | | |
| 10 | 10.668 | 28.46 | 1.51633 | 64.1 |
| 11 | ∞ | 0.20 | | |
| 12 | 21.388 | 2.30 | 1.60311 | 60.7 |
| 13 | −15.032 | 1.20 | 1.78472 | 25.7 |
| 14 | −21.862 | | | |

Asphericity coefficient
Surface No. 1
$K = -0.65833785 \times 10^1$
Surface No. 2                         $A6 = 0.26579458 \times 10^{-6}$
$K = -0.45719581 \times 10^1$
Surface No. 12                        $A6 = 0.246542131 \times 10^{-6}$
$K = -0.64892742 \times 10^1$
$N_2 = 0.539$                         $100/f_4 = 0.611$
$f_1/f_s = 3.341$                     $R_{e1}/f_6 = 0.530$

EXAMPLE 5

| Surface No. | $r_i$ | $d_i$ | $n_i$ | $v_i$ |
|---|---|---|---|---|
| \multicolumn{5}{c}{$2\omega = 52.4° \sim 19.4°$ eye ring, 4 mm$^\phi$} | | | | |
| 1 | 11.530 | 1.50 | 1.80518 | 25.4 |
| 2 | 9.317 | 3.88 | 1.56873 | 63.1 |
| 3 | 141.455 | 0.61~6.22 | | |
| 4 | 2411.715 | 1.50 | 1.80400 | 46.6 |
| 5 | 5.320 | 13.51~6.00 | | |
| 6 | 7.346 | 1.00 | 1.80518 | 25.4 |
| 7 | 3.973 | 2.00 | 1.53172 | 48.9 |
| 8 | −7.804 | 0.50~2.40 | | |
| 9 | −6.613 | 2.00 | 1.51633 | 64.1 |
| 10 | −7.534 | 15.84 | | |
| 11 | 9.421 | 30.48 | 1.51633 | 64.1 |
| 12 | ∞ | 0.20 | | |
| 13 | 36.476 | 2.50 | 1.77250 | 49.6 |
| 14 | −28.483 | | | |

Asphericity coefficient
Surface No. 1
$K = -0.25736010$
$N_2 = 0.709$                         $100/f_4 = -0.249$
$f_1/f_s = 2.416$                     $R_{e1}/f_6 = 0.446$

EXAMPLE 6

| Surface No. | $r_i$ | $d_i$ | $n_i$ | $v_i$ |
|---|---|---|---|---|
| \multicolumn{5}{c}{$2\omega = 52.2° \sim 14.6°$ eye ring, 4 mm$^\phi$} | | | | |
| 1 | 12.417 | 1.50 | 1.59270 | 35.3 |
| 2 | 9.534 | 4.95 | 1.48749 | 70.2 |
| 3 | −130.372 | 1.20~8.37 | | |
| 4 | −13.458 | 1.50 | 1.49186 | 57.4 |
| 5 | 2.606 | 1.30 | | |
| 6 | 4.593 | 1.50 | 1.74950 | 35.3 |
| 7 | 7.081 | 9.20~1.95 | | |
| 8 | 7.485 | 1.00 | 1.83400 | 37.2 |
| 9 | 4.590 | 1.80 | 1.48749 | 70.2 |
| 10 | −10.131 | 0.50~6.13 | | |
| 11 | 13.939 | 8.00 | 1.49186 | 57.4 |
| 12 | 27.368 | 9.30 | | |
| 13 | 8.982 | 32.00 | 1.49186 | 57.4 |
| 14 | −14.311 | 1.00 | | |
| 15 | 12.498 | 3.50 | 1.58900 | 48.6 |
| 16 | −9.592 | 1.00 | 1.69895 | 30.1 |
| 17 | 25.866 | | | |

Asphericity coefficient
Surface No. 1                         $A4 = 0.97935539 \times 10^{-5}$
$K = -0.21261354$                     $A8 = 0.10671989 \times 10^{-8}$
Surface No. 5                         $A6 = 0.52313432 \times 10^{-4}$
$K = -0.67136337$
Surface No. 11                        $A6 = -0.64584433 \times 10^{-5}$
$K = -0.20726593 \times 10^1$
$N_2 = 0.732$                         $100/f_4 = 2.071$
$f_1/f_s = 2.513$                     $R_{e1}/f_6 = 0.456$

EXAMPLE 7

| Surface No. | $r_i$ | $d_i$ | $n_i$ | $v_i$ |
|---|---|---|---|---|
| \multicolumn{5}{c}{$2\omega = 52.2° \sim 14.6°$ eye ring, 4 mm$^\phi$} | | | | |
| 1 | 13.714 | 1.50 | 1.59551 | 39.2 |
| 2 | 11.956 | 6.34 | 1.48749 | 70.2 |
| 3 | −89.387 | 1.20~9.37 | | |
| 4 | −12.566 | 1.50 | 1.49186 | 57.4 |
| 5 | 2.509 | 1.30 | | |
| 6 | 4.736 | 1.50 | 1.74950 | 35.3 |
| 7 | 8.086 | 8.65~1.40 | | |
| 8 | 10.584 | 3.79 | 1.48749 | 70.2 |
| 9 | −14.083 | 0.50~3.30 | | |
| 10 | 10.993 | 8.00 | 1.49186 | 57.4 |
| 11 | 20.861 | 9.30 | | |
| 12 | 9.060 | 32.00 | 1.49186 | 57.4 |
| 13 | −16.589 | 1.00 | | |
| 14 | 11.851 | 3.50 | 1.60738 | 56.8 |
| 15 | −12.844 | 1.00 | 1.78472 | 25.7 |
| 16 | 32.188 | | | |

Asphericity coefficient
Surface No. 1                         $A4 = -0.16837054 \times 10^{-4}$
$K = -0.14472544$                     $A8 = -0.83138880 \times 10^{-9}$
Surface No. 5                         $A6 = -0.98383473 \times 10^{-4}$
$K = -0.71060213$
Surface No. 10                        $A6 = -0.17941402 \times 10^{-4}$
$K = -0.40427126 \times 10^1$
$N_2 = 0.889$                         $100/f_4 = 2.682$
$f_1/f_s = 2.568$                     $R_{e1}/f_6 = 0.457$

EXAMPLE 8

$2\omega = 52.6° \sim 19.8°$ eye ring, 4 mm$^\phi$

-continued

| Surface No. | $r_i$ | $d_i$ | $n_i$ | $\gamma_i$ |
|---|---|---|---|---|
| 1 | 18.295 | 1.50 | 1.58547 | 29.9 |
| 2 | 10.875 | 4.30 | 1.49186 | 57.4 |
| 3 | −18.882 | 0.83∼5.15 | | |
| 4 | −11.041 | 1.50 | 1.49186 | 57.4 |
| 5 | 2.880 | 1.56 | | |
| 6 | 6.123 | 2.05 | 1.49186 | 57.4 |
| 7 | 23.205 | 8.93∼0.50 | | |
| 8 | 9.680 | 1.50 | 1.58547 | 29.9 |
| 9 | 5.000 | 2.33 | 1.49186 | 57.4 |
| 10 | −7.871 | 15.54∼19.64 | | |
| 11 | 8.960 | 27.32 | 1.49186 | 57.4 |
| 12. | ∞ | 0.20 | | |
| 13 | 18.415 | 2.55 | 1.49186 | 57.4 |
| 14 | −18.210 | | | |

Asphericity coefficient

Surface No. 1
$K = -0.66475739 \times 10^1$
Surface No. 3    $A_6 = 0.10215282 \times 10^{-5}$
$K = -0.99662223$
Surface No. 5    $A_6 = -0.12343793 \times 10^{-4}$
$K = -0.11043028 \times 10^1$
Surface No. 10    $A_6 = 0.21809394 \times 10^{-4}$
$K = -0.14136083 \times 10^1$
Surface No. 13    $A_6 = -0.27092237 \times 10^{-5}$
$K = -0.64268915 \times 10^1$
$N_2 = 0.513$
$f_1/f_s = 2.374$
$R_{e1}/f_6 = 0.460$

EXAMPLE 9

$2\omega = 52.2° \sim 19.4°$    eye ring. 4 mm$^\phi$

| Surface No. | $r_i$ | $d_i$ | $n_i$ | $\gamma_i$ |
|---|---|---|---|---|
| 1 | 21.133 | 1.50 | 1.58547 | 29.9 |
| 2 | 11.543 | 4.42 | 1.49186 | 57.4 |
| 3 | −19.219 | 0.81∼5.64 | | |
| 4 | −11.931 | 1.50 | 1.49186 | 57.4 |
| 5 | 3.580 | 1.50 | | |
| 6 | 6.380 | 2.01 | 1.49186 | 57.4 |
| 7 | 14.535 | 9.44∼0.50 | | |
| 8 | 10.076 | 1.50 | 1.58547 | 29.9 |
| 9 | 5.000 | 2.32 | 1.49186 | 57.4 |
| 10 | −8.073 | 16.01∼20.12 | | |
| 11 | 11.139 | 3.02 | 1.49186 | 57.4 |
| 12. | −36.167 | 18.47 | | |
| 13 | 20.044 | 2.48 | 1.49186 | 57.4 |
| 14 | −20.332 | | | |

Asphericity coefficient

Figure 35:
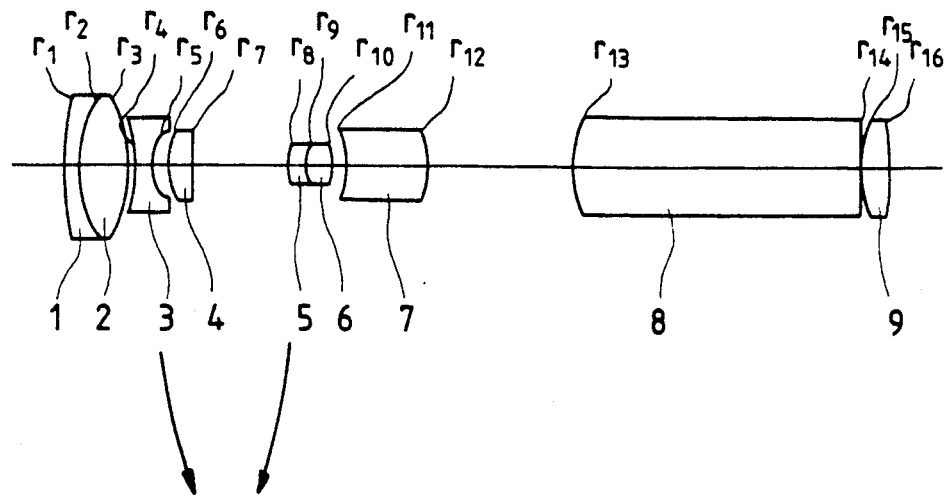
FIGS. 35 to 37 show a first embodiment of a real image type finder according to the present invention, in which an arrangement of a lens system of the finder is shown in FIG. 35, graphs showing aberrations at the wide angle end are shown in FIG. 36, and graphs showing aberrations at the telescopic end are shown in FIG. 37.
Figure 36:
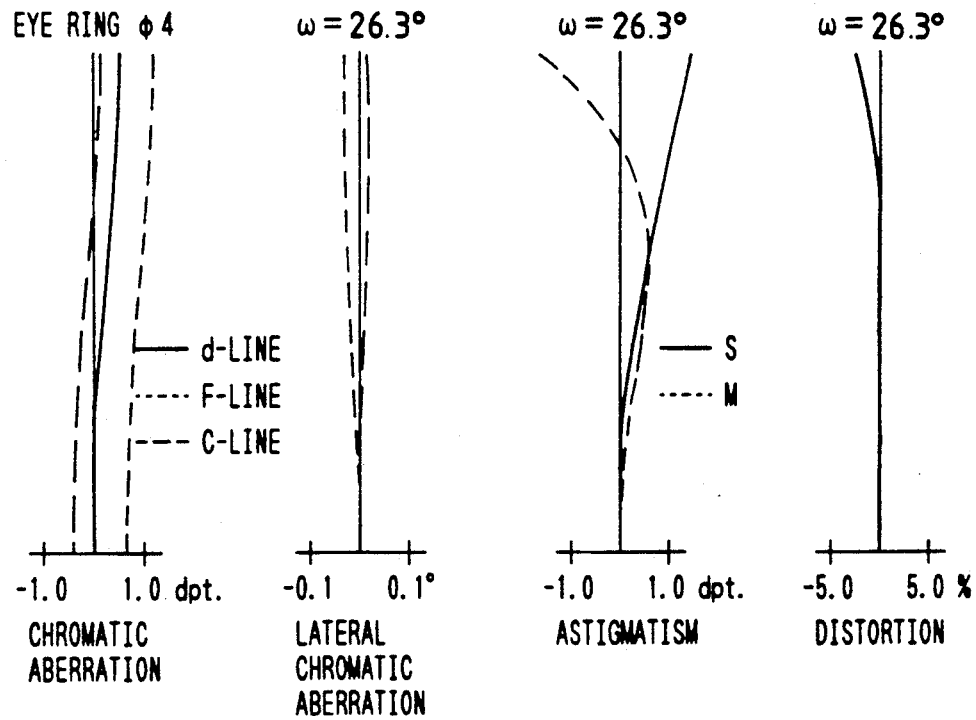
Figure 37:
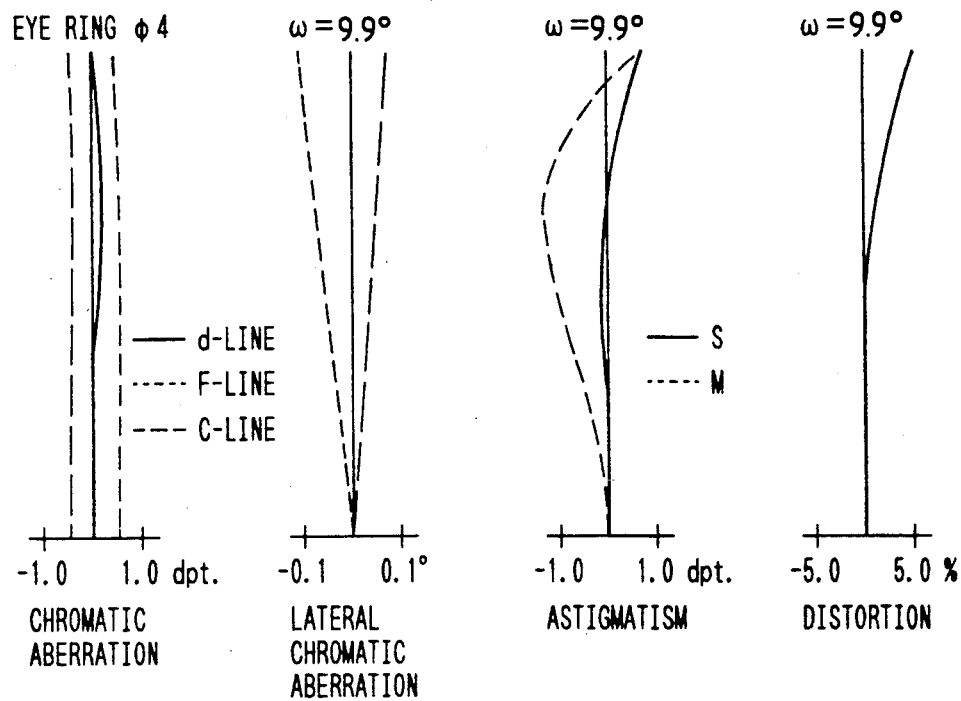

Surface No. 1
$K = -0.66886643 \times 10^1$
Surface No. 3    $A_6 = 0.79539756 \times 10^{-6}$
$K = -0.10104418 \times 10^1$
Surface No. 5    $A_6 = -0.17248913 \times 10^{-4}$
$K = -0.98530482$
Surface No. 10    $A_6 = 0.36601805 \times 10^{-5}$
$K = -0.17075487 \times 10^1$
Surface No. 13    $A_6 = -0.19302144 \times 10^{-5}$
$K = -0.65187390 \times 10^1$
$N_2 = 0.523$
$f_1/f_s = 2.406$
$R_{e1}/f_6 = 0.533$ FIGS. 35 to 37 show a tenth embodiment of a real image type finder according to the present invention.

The finder, as shown in FIG. 35, is composed of a positive objective system including lens elements 1 to 6, and a positive ocular system including a Porro prism 8 and a lens 9. In FIG. 1, the Porro prism 8 for inverting an image is depicted in the form of a glass block into which the Porro prism is developed.

The objective system is made up of a first positive group of lens elements (referred to a first lens group) in which first and second resin lens elements 1 and 2 are cemented, a second group of a positive lens element 3 and a positive lens element 4 (referred to as a second lens group), and a third group of negative lens element 5 and positive lens element 6 made of resin (referred to as a third lens group).

The finder under discussion is a zoom finder in which magnifying power is varied by moving the second and third lens groups in the direction of the illustrated arrows, and a variation of a diopter of the finder is also compensated for.

In the real image type finder, light from an object is imaged by an objective system, and then is converted into afocal rays of light by an ocular system. To reduce the total length of the finder while keeping a high magnifying power of the finder, the focal distances of both the objective and ocular systems must be short.

Let a focal length of the ocular system be fe (mm); an on-axis chromatic aberration of the objective system, $\delta$(mm); and an on-axis chromatic aberration of the whole finder, $\Delta$(dpt.). Then the axial chromatic aberration $\Delta$ is expressed by $$\Delta = 1000 \times \delta/fe^2$$

The above equation indicates that the on-axis chromatic aberration in the whole finder system becomes larger as the focal distance of the ocular system becomes shorter.

In the case of the zoom finder, when the magnifying power is varied, a magnifying power of a moving lens group varies, causing a variation of the chromatic and spherical aberrations. The zoom finder used in the embodiment 1 has a large zoom ratio of 2.6. Therefore, variations of the various aberrations are also large in the zoom finder.

In the tenth embodiment, the first lens group of a large positive power is a cemented lens consisting of negative and positive lens elements, thereby to suppress generation of the chromatic and spherical aberrations. Further, the third lens group as a moving lens group is a cemented lens consisting of negative and positive lens elements, thereby to suppress variations of the various aberrations resulting from varying the magnifying power. With such a cemented lens, it is possible to miniaturize the overall lens system.

The lens system thus arranged is specified in Example 10, and the various aberrations of the lens system are as shown in FIGS. 36 and 37. Graphs shown in FIG. 36 show the aberrations of the lens system at the wide angle end (short focal distance), and graphs shown in FIG. 37 the aberrations at the telephoto end (long focal distance).

In the table, "r" represents radius of curvature of the lens system, "d" thickness and air gap of the lens system, "n" the index of refraction of the lens system and "v" abbe number of the lens system.

In the lens system, first, third, fifth, tenth, and fifteenth faces are aspherical. For an aspherical surface, as mentioned before, the following equation holds $$X = \frac{CY^2}{1 + \sqrt{1 - (1 + K)C^2 Y^2}} + A_4 Y^4 + A_6 Y^6 + A_8 Y^8$$

where X is the distance between the coordinates on the aspherical surface where the height from the optical axis is Y, and a tangential plane at the aspherical vertex, C is the radius of curvature (1/r) at the vertex of the aspherical surface, K is the conic coefficient, and A4 to A8 are 4th to 8th degree aspherical surface coefficients. Specific values of these coefficients are as shown in Example 10. The radius of curvature of the aspherical surface in Example 10 is the radius of curvature at the vertex of the aspherical surface.

In FIGS. 36 and 37, for the spherical aberration, the spherical aberration SA is indicated by a solid line, and the sine condition by a broken line. For the axial chromatic aberration and the lateral chromatic aberration, three types of data of d-line (558 nm), g-line (436 nm), and C-line (656 nm) are presented. For the astigmatism, the sagittal direction S is indicated by a solid line, and the meridional direction M by a broken line.

In the tenth embodiment, the positive and negative lens elements of the cemented lens are both made of resin; PMMA for the positive lens element and polycarbonate for the negative lens element. Therefore, the lens elements may readily be formed in any desired shape. The injection molding process, when used for forming the lens elements, can produce the lens elements in mass production, and at much lower cost than the lens manufacturing process using glass.

EXAMPLE 10

| Surface No. | $2\omega = 52.6\sim19.8°$ eye ring, 4 mm$\phi$ | | | |
|---|---|---|---|---|
| | r | d | n | $\gamma$ |
| 1 | 18.773 | 1.50 | 1.58547 | 29.9 |
| 2 | 12.852 | 4.30 | 1.49186 | 57.4 |
| 3 | −18.695 | 0.80~5.23 | | |
| 4 | −11.352 | 1.50 | 1.49186 | 57.4 |
| 5 | 3.096 | 1.55 | | |
| 6 | 5.574 | 2.05 | 1.49186 | 57.4 |
| 7 | 12.017 | 8.47~0.50 | | |
| 8 | 9.880 | 1.50 | 1.58547 | 29.9 |
| 9 | 5.000 | 2.33 | 1.49186 | 57.4 |
| 10 | −6.878 | 0.50~4.4 | | |
| 11 | −12.373 | 7.50 | 1.49186 | 57.4 |
| 12 | −12.000 | 12.72 | | |
| 13 | 10.285 | 27.30 | 1.49186 | 57.4 |
| 14 | ∞ | 0.20 | | |
| 15 | 20.308 | 2.55 | 1.49186 | 57.4 |
| 16 | −17.710 | | | |

| 1st surface | $A4 = 0.00000000$ |
|---|---|
| $K = -0.64198400 \times 10^1$ | $A6 = 0.00000000$ |
| | $A8 = 0.00000000$ |
| 3rd surface | $A4 = 0.00000000$ |
| $K = -0.99918000$ | $A6 = 0.79509400 \times 10^{-6}$ |
| | $A8 = 0.00000000$ |
| 5th surface | $A4 = 0.00000000$ |
| $K = -0.89834000$ | $A6 = 0.48704300 \times 10^{-4}$ |
| | $A8 = 0.00000000$ |
| 10th surface | $A4 = 0.00000000$ |
| $K = -0.14451500 \times 10^1$ | $A6 = 0.14751900 \times 10^{-4}$ |
| | $A8 = 0.00000000$ |
| 15th surface | $A4 = 0.00000000$ |
| $K = -0.61570500 \times 10^1$ | $A6 = 0.26725800 \times 10^{-5}$ |
| | $A8 = 0.00000000$ |

The positive and negative lens elements forming a cemented lens for aberration compensation have both large power. Particularly the radius of curvature of the cemented face of each element is small. Where the cemented lenses are separately disposed, total reflection occurs on the faces of the lens elements which face each other, or the aberration degradation is more sensitive to a misalignment of the optical axis of the positive lens element with that of the negative lens element. To avoid those disadvantages, high precision is required for the outer diameter of the lens and the lens frame.

The positive lens elements of the cemented lenses are made of material not containing a UV-blocking substance, PMMA of high transmittance for ultraviolet rays. Accordingly, when a UV-cured adhesive is used for cementing the lens elements together, it can be completely hardened by irradiating the lens elements with ultraviolet rays through the positive lens.

When ultraviolet rays reach those positive lens elements 2 and 6 of the cemented lenses assembled into a finder, the lens elements are retrodegraded to change color. To cope with this, polycarbonate containing UV-blocking substances is used for the lens element 1 closer to an object than those lens elements. PMMA containing a UV-blocking substance is used for the lenses in the ocular optical system closer to the eye. With such a selective use of materials for the lens elements, ultraviolet rays are absorbed by the lens elements on both sides of the finder, and fail to reach the positive lens elements 2 and 6. Consequently, those lens elements do not change color due to the retrogradation of aging.

Figure 38:
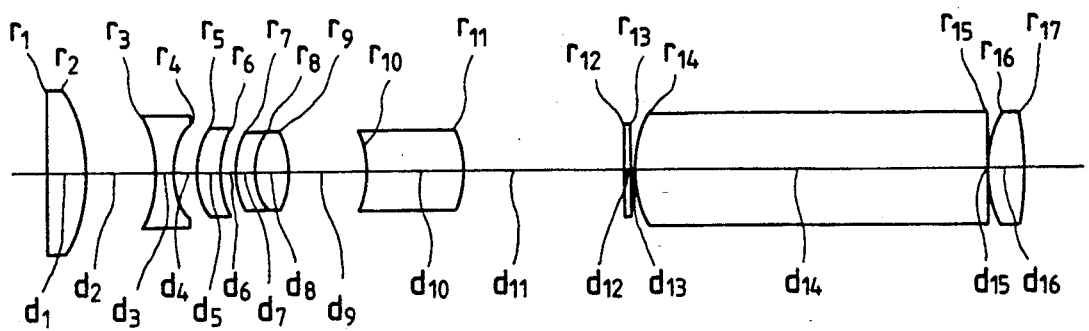
FIGS. 38 to 40 show a second embodiment of a real image type finder according to the present invention, in which an arrangement of a lens system of the finder is shown in FIG. 38, graphs showing aberrations at the wide angle end are shown in FIG. 39, and graphs showing aberrations at the telescopic end are shown in FIG. 40.

FIG. 38 shows an eleventh embodiment of a real image type finder according to the present invention.

Figure 39:
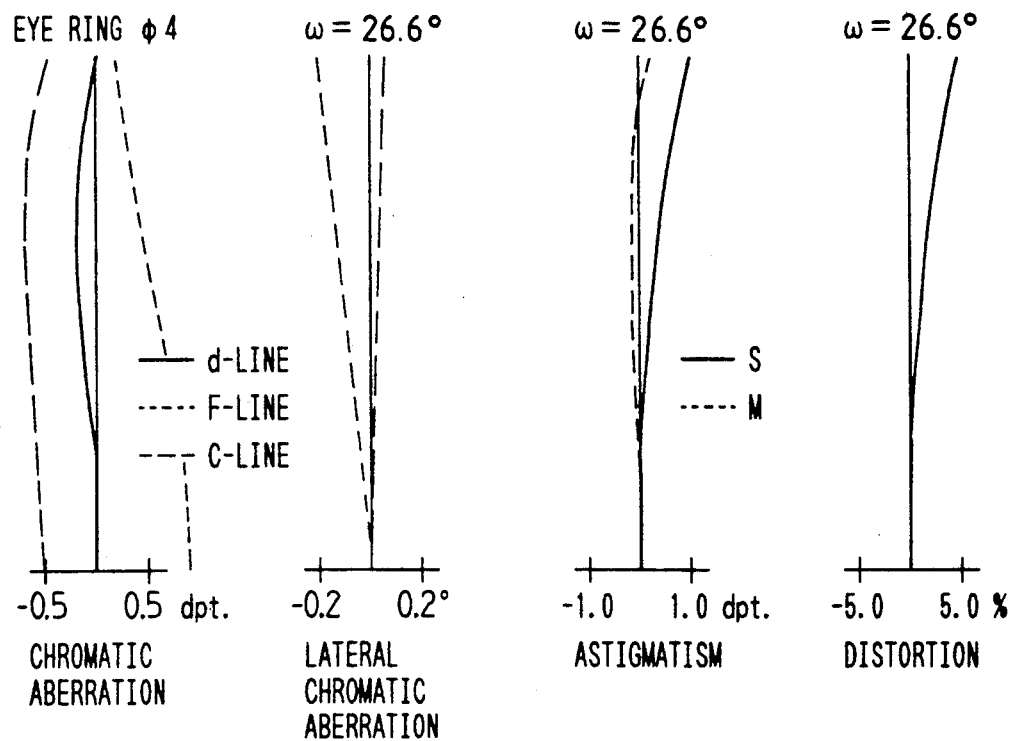
Figure 40:
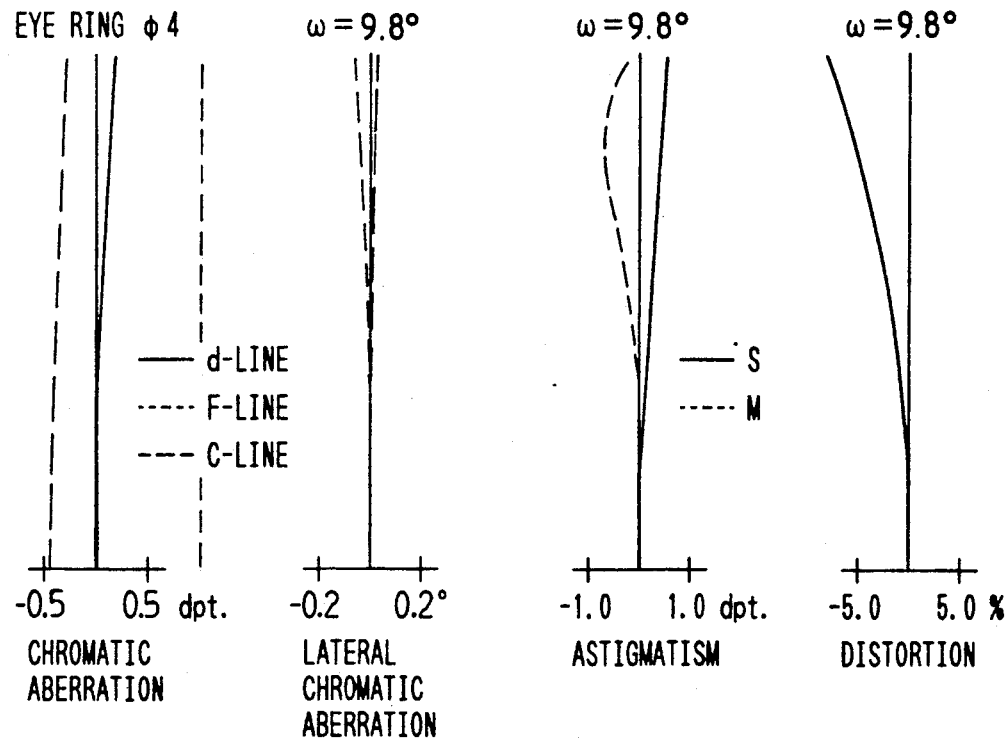

A lens system of the finder is specified with figures shown in Example 11. The aberrations are as illustrated in FIGS. 39 and 40. FIG. 39 shows the aberrations at the wide angle end, and FIG. 40 the aberrations at the telescopic end.

The first, second, fourth, ninth, and sixteenth faces of the lens elements are aspherical, and the aspherical surface coefficients are shown in Example 11.

EXAMPLE 11

| Surface No. | $2\omega = 53.2\sim19.6°$ eye ring, 4 mm$\phi$ | | | |
|---|---|---|---|---|
| | r | d | n | $\gamma$ |
| 1 | ∞ | 2.96 | 1.49186 | 57.4 |
| 2 | −13.529 | 5.51~1.37 | | |
| 3 | −10.447 | 1.40 | 1.49186 | 57.4 |
| 4 | 4.941 | 2.02 | | |
| 5 | 6.738 | 2.04 | 1.49186 | 57.4 |
| 6 | 9.100 | 1.12~10.32 | | |
| 7 | 7.241 | 1.30 | 1.58547 | 29.9 |
| 8 | 4.080 | 2.85 | 1.49186 | 57.4 |
| 9 | −8.430 | 6.10~1.04 | | |
| 10 | −8.710 | 7.50 | 1.49186 | 57.4 |
| 11 | −11.190 | 13.04 | | |
| 12 | ∞ | 0.55 | 1.51633 | 64.1 |
| 13 | ∞ | 0.30 | | |
| 14 | 10.200 | 27.13 | 1.49186 | 57.4 |
| 15 | ∞ | 0.20 | | |
| 16 | 12.402 | 2.50 | 1.49186 | 57.4 |
| 17 | −42.685 | | | |

| 1st surface | $A4 = -0.82700000 \times 10^{-4}$ |
|---|---|
| $K = 0.00000000$ | $A6 = -0.21900000 \times 10^{-5}$ |
| | $A8 = 0.42500000 \times 10^{-7}$ |
| 2nd surface | $A4 = 0.95500000 \times 10^{-4}$ |
| $K = -0.61600000$ | $A6 = -0.25070000 \times 10^{-5}$ |
| | $A8 = 0.43300000 \times 10^{-7}$ |
| 4th surface | $A4 = 0.00000000$ |
| $K = -0.10250000 \times 10^1$ | $A6 = 0.00000000$ |
| | $A8 = 0.00000000$ |
| 9th surface | $A4 = 0.00000000$ |
| $K = -0.30920000 \times 10^1$ | $A6 = 0.39000000 \times 10^{-5}$ |
| | $A8 = 0.00000000$ |
| 16th surface | $A4 = 0.26300000 \times 10^{-3}$ |
| $K = -0.62400000 \times 10^1$ | $A6 = -0.27700000 \times 10^{-5}$ |
| | $A8 = 0.00000000$ |

Figure 41:
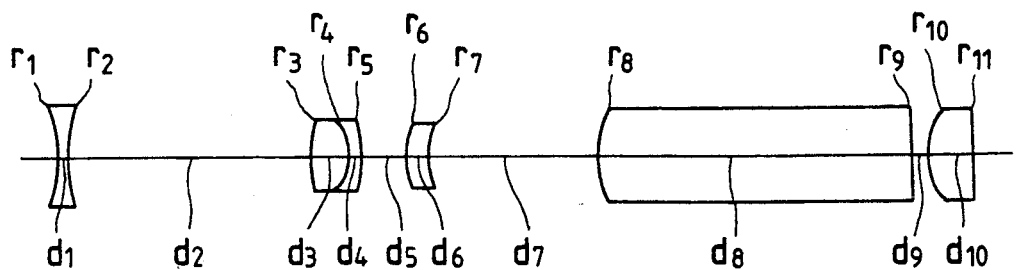

FIG. 41 shows a twelfth embodiment of a real image type finder according to the present invention.

Figure 42:
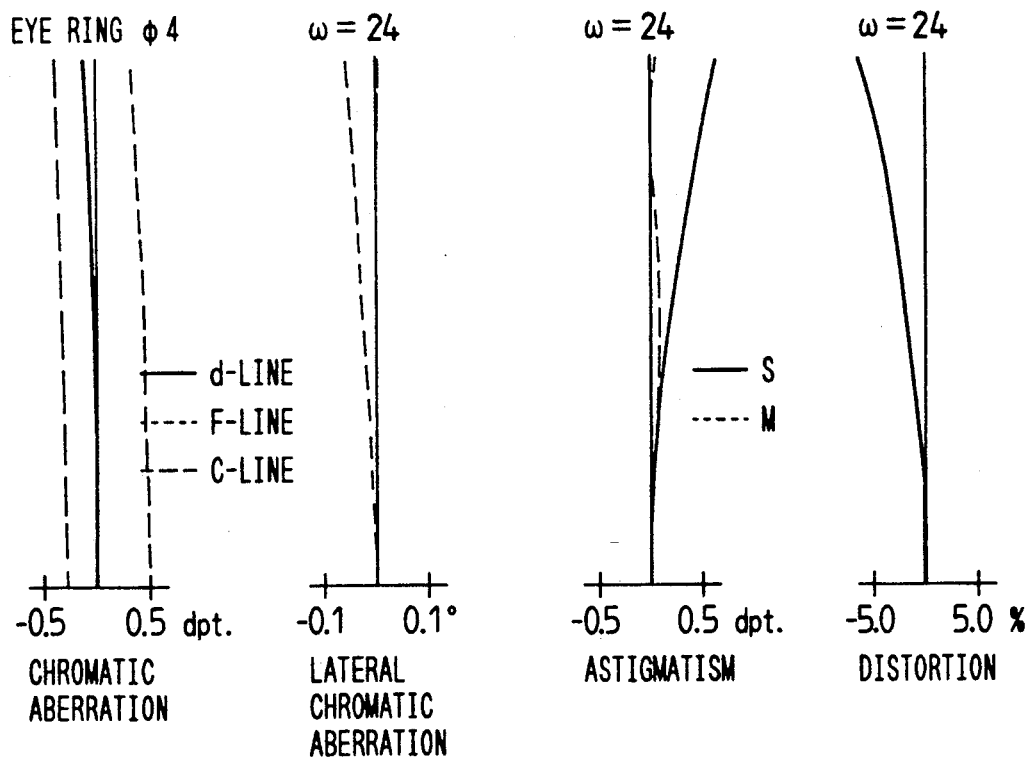

A lens system of the finder is specified with figures shown in Example 12. The aberrations are as illustrated in FIG. 42 and 43. FIG. 42 shows the aberrations at the wide angle end, and FIG. 43 the aberrations at the telephoto end.

The first, third, tenth, and eleventh faces of the lens elements are aspherical, and the aspherical surface coefficients are shown in Example 12.

EXAMPLE 12

| | $2\omega = 48 \sim 16°$ | eye ring, 4 mm$\phi$ | | |
|---|---|---|---|---|
| Surface No. | r | d | n | $\gamma$ |
| 1 | −21.292 | 1.80 | 1.49186 | 57.4 |
| 2 | 32.878 | 32.51~5.38 | | |
| 3 | 21.660 | 5.00 | 1.49186 | 57.4 |
| 4 | −7.769 | 2.00 | 1.80518 | 25.4 |
| 5 | −12.047 | 5.99~24.47 | | |
| 6 | 14.072 | 3.00 | 1.49186 | 57.4 |
| 7 | 10.481 | 22.70 | | |
| 8 | 15.440 | 42.00 | 1.49186 | 57.4 |
| 9 | ∞ | 2.50 | | |
| 10 | 12.765 | 5.40 | 1.49186 | 57.4 |
| 11 | 78.585 | | | |

1st surface  
$K = -0.34786192 \times 10^1$  
$A4 = 0.00000000$  
$A6 = -0.41446806 \times 10^{-6}$  
$A8 = 0.44376580 \times 10^{-8}$ 3rd surface  
$K = -0.17642562 \times 10^1$  
$A4 = -0.42529237 \times 10^{-4}$  
$A6 = 0.30444362 \times 10^{-6}$  
$A8 = 0.12533558 \times 10^{-7}$ 10th surface  
$K = 0.30562449$  
$A4 = 0.79880176 \times 10^{-4}$  
$A6 = 0.10716974 \times 10^{-6}$  
$A8 = 0.60035087 \times 10^{-8}$ 11th surface  
$K = 0.00000000$  
$A4 = 0.23461768 \times 10^{-3}$  
$A6 = 0.44353360 \times 10^{-6}$  
$A8 = 0.19874932 \times 10^{-7}$ FIG. 44 shows a thirteenth embodiment of a real image type finder according to the present invention.

Figure 45:
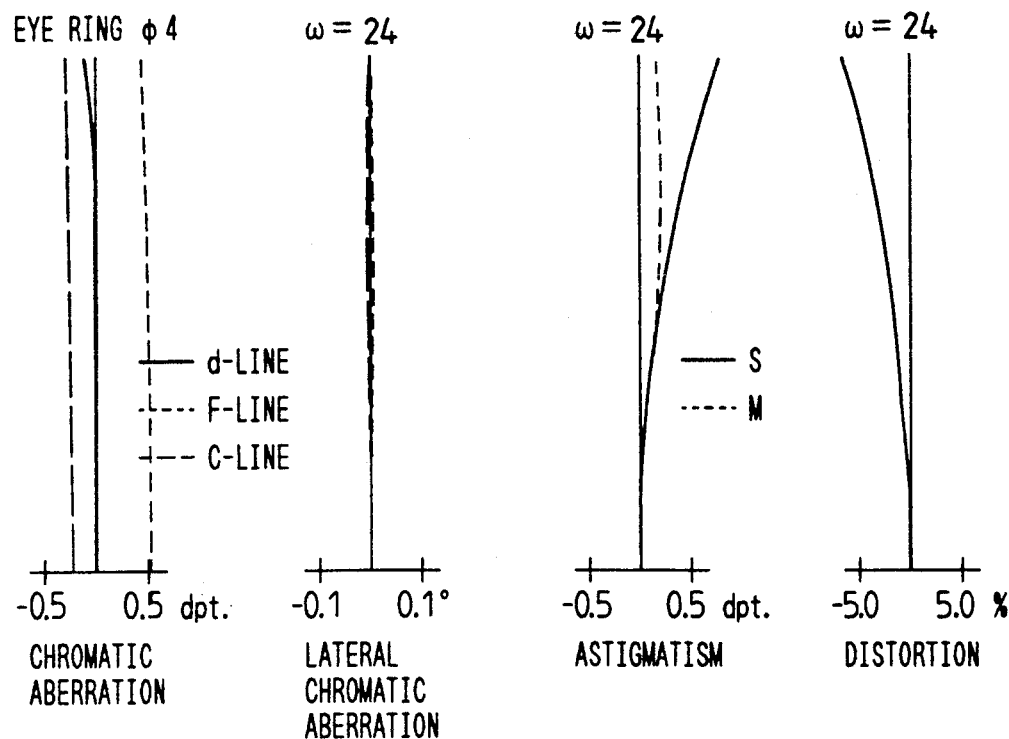
Figure 46:
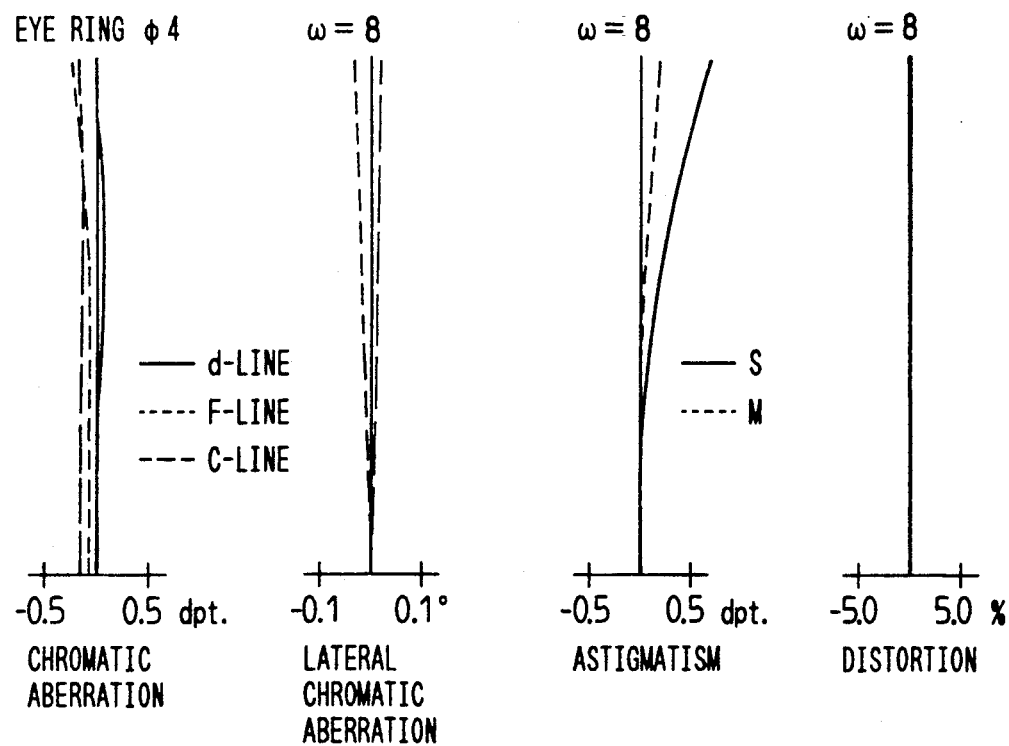

A lens system of the finder is specified with figures shown in Example 13. The aberrations are as illustrated in FIGS. 45 and 46. FIG. 45 shows the aberrations at the wide angle end, and FIG. 46 the aberrations at the telephoto end.

The first, third, tenth, and eleventh faces of the lens elements are aspherical, and the aspherical surface coefficients are shown in Example 13.

EXAMPLE 13

| | $2\omega = 48 \sim 16°$ | eye ring. 4 mm$\phi$ | | |
|---|---|---|---|---|
| Surface No. | r | d | n | $\gamma$ |
| 1 | −30.997 | 1.80 | 1.49186 | 57.4 |
| 2 | 37.168 | 34.27~3.41 | | |
| 3 | 31.229 | 5.00 | 1.49186 | 57.4 |
| 4 | −8.709 | 2.00 | 1.76182 | 26.6 |
| 5 | −13.646 | 26.43~49.93 | | |
| 6 | 23.094 | 3.50 | 1.49186 | 57.4 |
| 7 | −38.215 | 5.98 | | |
| 8 | ∞ | 42.00 | 1.49186 | 57.4 |
| 9 | ∞ | 2.50 | | |
| 10 | 12.765 | 5.40 | 1.49186 | 57.4 |
| 11 | 78.585 | | | |

1st surface  
$K = -0.13583084 \times 10^2$  
$A4 = 0.00000000$  
$A6 = -0.30601014 \times 10^{-7}$  
$A8 = 0.23170581 \times 10^{-9}$ 3rd surface  
$K = -0.17491622 \times 10^1$  
$A4 = -0.42876354 \times 10^{-4}$  
$A6 = -0.54144467 \times 10^{-6}$  
$A8 = 0.19052631 \times 10^{-7}$ 10th surface  
$K = -0.42281364 \times 10^{-1}$  
$A4 = 0.34093967 \times 10^{-4}$  
$A6 = 0.47647145 \times 10^{-7}$  
$A8 = 0.27093303 \times 10^{-8}$ 11th surface  
$K = 0.00000000$  
$A4 = 0.15206411 \times 10^{-3}$  
$A6 = -0.64469250 \times 10^{-7}$  
$A8 = 0.61256717 \times 10^{-8}$ FIGS. 47A to 51B show modifications of the cemented lens, which may be applied to the above-mentioned embodiments.

When the lens elements are cemented, adhesive is sometimes partially squeezed out. In this case, the cemented lens is improperly fit in a lens frame. To avoid the improper fitting, in the case of the glass lens, after the lens elements are cemented, the squeeze-out adhesive is melted away by solvent. If this method using solvent is applied to the resin lens, the lens per se is melted to be cloudy or opaque. In this respect, the squeeze-out adhesive removal method for the glass lenses cannot be applied for the removal of the squeeze-out adhesive of the resin lens.

Figure 47A:
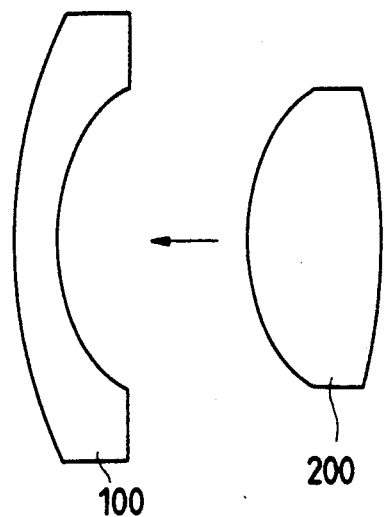
Figure 47B:
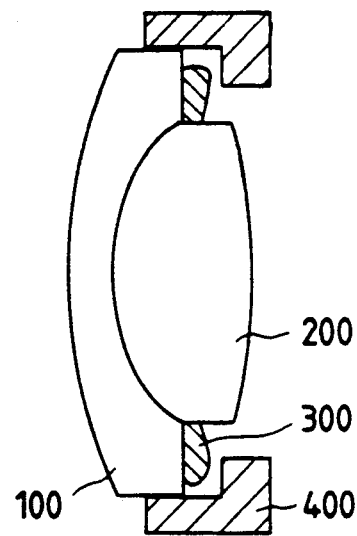

One of the measures for the squeeze-out adhesive now widely used is shown in FIG. 47A. As shown, of paired lens elements 100 and 200, the lens element 100 has a larger diameter than the lens element 200, thereby to prevent adhesive 300 from entering a space between the frame 400 and the paired lenses 100 and 200. In case where a large amount of the squeeze-out adhesive exists, it hinders the positioning of the lens to the lens frame, as shown in FIG. 47B. To minimize the squeeze-out adhesive, it is necessary to exactly control the amount of the adhesive. This impedes the progress of manufacturing finders.

Figure 48A:
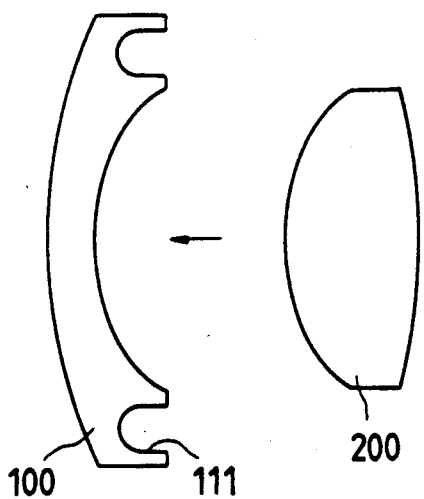
Figure 48B:
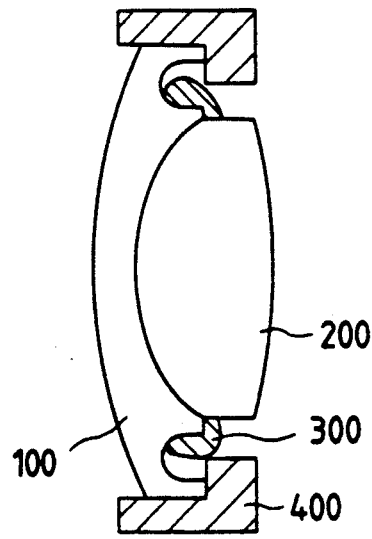

In a modification of the cemented lens shown in FIG. 48A, a groove 111 is formed on the inner fringe of the lens 100 of large diameter. If a large amount of the adhesive 300 is squeezed out, the squeeze-out adhesive flows into the groove, as shown in FIG. 48B, and will not hinder the mounting of the paired lens elements 100 and 200 to the frame 400.

Figure 49A:
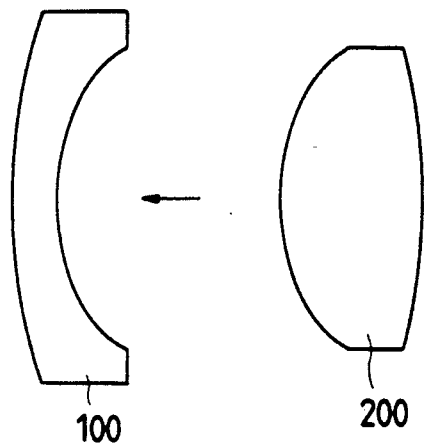
Figure 49B:
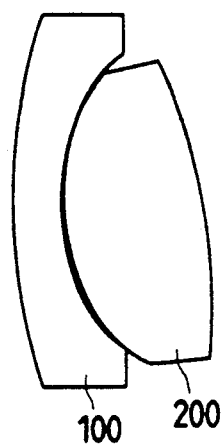

In cementing together two lens elements 100 and 200 as shown in FIG. 49A, if the lens elements are cemented, with misalignment of the optical axes of the lens elements, as shown in FIG. 49B, the optical performances of the cemented lens is remarkably degraded. In the cementing work, therefore, great care must be taken for the alignment of the optical axes of the lens elements.

By convention, a jig, such as a bell chuck, is used for the alignment of the optical axes of the lens elements. The aligning work using the jig, however, is disadvantageous in the following points. Intricate and troublesome work is required. In this respect, it is unsuitable for mass-production. When it is applied for resin lens elements, the jig is likely to scratch the surfaces of the lens elements during the aligning work.

Figure 50A:
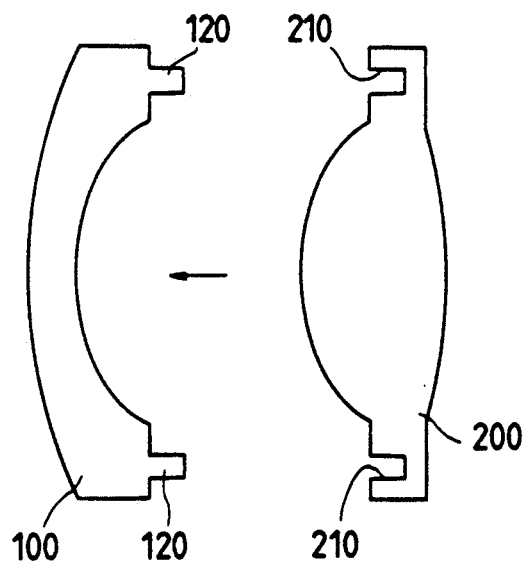
Figure 50B:
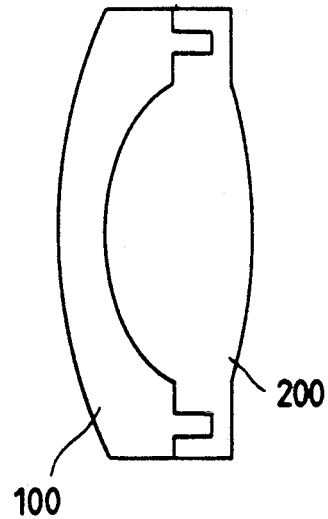

FIGS. 50A and 50B show a measure to solve the above problem. As shown in FIG. 50A, a protruded portion 120 is formed on the inner fringe of the lens element 100. A recess portion 210 is formed in the inner fringe of the lens element 200. When those lens elements are coupled for cementing, the protruded portion 120 of the lens element 100 is fit into the recess portion 210 of the lens element 200. The protruded portion 120 and the recess portion 210 are so positioned that the optical axes of the lens elements are aligned with each other when the lens elements are coupled. In this respect, the protruded portion 120 and the recess portion 210 make up a positioning structure.

With such a positioning structure, the optical axes of the lens elements can be exactly aligned with each other by merely fitting the protruded portion 120 into the recess portion 210 without any type of jig. The lens elements can be cemented together while the optical axes of them are exactly aligned.

In making the cemented lens, a curing process of the coupled lens elements follows the alignment work. However, there is the possibility that the alignment of the optical-axes of the lens elements is lost before the adhesive is completely hardened.

Figure 51A:
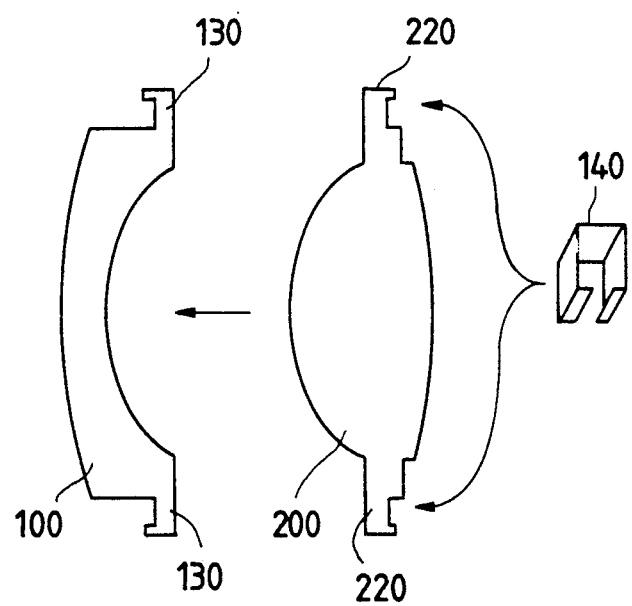
Figure 51B:
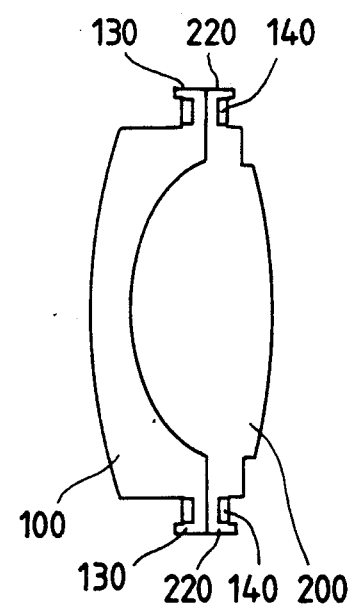

A modification of the cemented lens to solve the above problem follows. As shown in FIG. 51A, protruded portions 130 and 220 are formed on the circumferential edges of the lens elements 100 and 200, respectively. When the lens elements are coupled for cementing, the mated protruded portions are fixed by a U-shaped means 140, as shown in FIG. 51B. In this way, the misalignment of the optical axes of the lens elements that possibly occurs during the curing process, can be prevented.

When the modification of FIGS. 51A and 51B is used, the alignment of the lens elements can be maintained even in the half-hardening of the adhesive. This fact implies that UV-cured adhesive may be even when both the lens elements to be cemented contain an infrared blocking. Further, the lens elements are fixed by only the fixing structure, and a gap between the lens elements may be filled with fluid with no adhesion, such as oil.

As seen from the foregoing description, in the real image type finder according to the present invention, use of the cemented lens of plastic is allowed. Accordingly, the finder incorporating the cemented lens is operated at high magnification and with satisfactory compensation of the aberrations. Further, the finder is free from the problem of ghost due to the reflection on the face of the lens element whose radius of curvature is unsatisfactory, and the problem of remakable aberrations due to improper positioning of the lens elements.

We claim:

1. An optical system comprising:
at least one cemented lens formed of plural lens elements, at least one of said lens elements being made of resin, and wherein a movable lens group for zooming and for compensation for one of focusing offset and displacement is formed solely by said at least one cemented lens.

2. A real image type finder comprising at least one cemented lens formed of plural lens elements, with at least one of said plural lens elements being made of resin, and in which at least one of said plural lens elements is made of material of high transmittance to ultraviolet rays.

3. A real image type finder according to claim 2, in which at least one of said plural lens elements includes a means for receiving adhesive squeezed out of said cemented lens.

4. A real image type finder according to claim 2, in which at least one of said plural lens elements includes a positioning structure means for aligning the optical axes of said plural lens elements.

5. A real image type finder according to claim 2 in which at least one of said plural lens elements includes a fixing structure means which cooperates with a clamping means for clamping said cemented lens from both sides of said cemented lens while holding said lens elements with their optical axes in alignment.

6. A real image type finder according to claim 2, wherein said at least one cemented lens comprises at least one aspherical surface.

7. A real image type finder according to claim 6, wherein a movable lens group for zooming and for compensation for one of focusing offset and displacement is formed solely by said at least one cemented lens.

8. A real image type finder according to claim 2, wherein a movable lens group for zooming and for compensation for one of focusing offset and displacement is formed solely by said at least one cemented lens.

9. A real image finder according to claim 2, further comprising means for preventing UV light from passing through said cemented lens.

10. A real image finder according to claim 9, wherein said means comprises a lens element having a UV-blocking substance and disposed on a side of said cemented lens toward an object, and a lens element having a UV-blocking substance and disposed on a side of said cemented lens toward an eyepiece.

11. A real image finder according to claim 9, wherein said cemented lens comprises first and second lens elements cemented together by a UV-cured adhesive.

12. A real image finder according to claim 2, wherein said cemented lens comprises a first lens element made of polycarbonate resin and a second lens made of PMMA resin.

13. A real image finder according to claim 2, wherein said cemented lens comprises a first lens element incorporating a UV-blocking substance and a second lens element having a higher UV light transmittance than said first lens element.

14. A real image finder according to claim 13, wherein said cemented lens comprises first and second lens elements cemented together by a UV-cured adhesive.

15. A real image finder according to claim 2, wherein said cemented lens comprises first and second lens elements cemented together by a UV-cured adhesive.

16. A real image type finder comprising at least one cemented lens formed of plural lens elements, with at least one of said plural lens elements being made of resin, and in which at least one of said plural lens elements includes a means for receiving adhesive squeezed out of said cemented lens.

17. A real image type finder comprising at least one cemented lens formed of plural lens elements, with at least one of said plural lens elements being made of resin, in which at least one of said plural lens elements includes a positioning structure means for aligning the optical axes of said plural lens elements.

18. A real image type finder according to claim 17, in which said positioning structure means comprises a fixing structure means which cooperates with a clamping means for clamping said cemented lens from both sides of said cemented lens while holding said lens elements with their optical axes in alignment.

* * * * *